US012675064B2

(12) United States Patent
Asanuma et al.

(10) Patent No.: US 12,675,064 B2
(45) Date of Patent: Jul. 7, 2026

(54) DEVELOPER ACCOMMODATING DEVICE, DEVELOPING DEVICE, CARTRIDGE AND IMAGE FORMING APPARATUS

(71) Applicant: CANON KABUSHIKI KAISHA, Tokyo (JP)

(72) Inventors: Naoya Asanuma, Shizuoka (JP); Daisuke Abe, Shizuoka (JP); Yu Fukasawa, Tokyo (JP); Kazutaka Sueshige, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/931,120

(22) Filed: Oct. 30, 2024

(65) Prior Publication Data

US 2025/0053119 A1 Feb. 13, 2025

Related U.S. Application Data

(62) Division of application No. 18/241,315, filed on Sep. 1, 2023, now Pat. No. 12,204,263, which is a division (Continued)

(30) Foreign Application Priority Data

May 12, 2021 (JP) ................................ 2021-080963

(51) Int. Cl.
*G03G 15/08* (2006.01)
*G03G 21/16* (2006.01)

(52) U.S. Cl.
CPC ..... *G03G 15/0889* (2013.01); *G03G 15/0886* (2013.01); *G03G 15/0893* (2013.01); *G03G 21/1647* (2013.01); *G03G 21/1676* (2013.01)

(58) Field of Classification Search
CPC ........... G03G 15/0886; G03G 15/0889; G03G 15/0893; G03G 21/1647; G03G 21/1676; G03G 21/1817; G03G 21/1821
See application file for complete search history.

(56) References Cited

U.S. PATENT DOCUMENTS 8,995,887 B2 3/2015 Nakamura et al.
9,316,946 B2 4/2016 Ohgoshi
(Continued)

FOREIGN PATENT DOCUMENTS

CN 104808462 A 7/2015
EP 0895136 A2 2/1999
(Continued)

OTHER PUBLICATIONS

Japanese Office Action dated Nov. 19, 2024, in related Japanese Patent Application No. 2021-080963.

*Primary Examiner* — Sophia S Chen
(74) *Attorney, Agent, or Firm* — VENABLE LLP

(57) ABSTRACT

A process cartridge includes a photosensitive member unit with a photosensitive drum, a developing unit detachably mounted on the photosensitive member, and a toner cartridge detachably mounted on the developing unit. The toner cartridge has a holder including a protruding portion on an end side thereof, and the developing unit is provided with a rotatable lift member on an end side thereof. In a mounted state in which the toner cartridge is mounted on the developing unit, the toner cartridge is maintained in the mounted state by engaging of a first portion of the lift member with the protruding portion, and the toner cartridge is transited from the mounted state to a lifted state in which the toner cartridge is rotated upward by contacting of a second portion of the lift member to the protruding portion with rotation of the lift member.

20 Claims, 24 Drawing Sheets

Related U.S. Application Data of application No. 17/741,548, filed on May 11, 2022, now Pat. No. 11,782,360.

(56) References Cited

U.S. PATENT DOCUMENTS

| | | | | |
|---|---|---|---|---|
| 9,910,384 | B2 | 3/2018 | Sato | |
| 9,946,196 | B2 | 4/2018 | Nishiyama et al. | |
| 10,133,213 | B2 | 11/2018 | Sato | |
| 10,444,669 | B2 | 10/2019 | Sato | |
| 11,435,689 | B2 | 9/2022 | Kawakami et al. | |
| 11,762,326 | B2 | 9/2023 | Kawakami et al. | |
| 12,204,263 | B2 * | 1/2025 | Asanuma ........... | G03G 15/0893 |
| 2017/0285528 | A1 | 10/2017 | Nishiyama et al. | |
| 2018/0253029 | A1 | 9/2018 | Amano | |
| 2020/0209780 | A1 | 7/2020 | Hamada | |
| 2020/0341423 | A1 | 10/2020 | Kawakami et al. | |
| 2023/0367258 | A1 | 11/2023 | Kawakami et al. | |

FOREIGN PATENT DOCUMENTS

| | | | |
|---|---|---|---|
| JP | 2008-224974 | A | 9/2008 |
| JP | 2014-021442 | A | 2/2014 |
| JP | 2014-137518 | A | 7/2014 |
| JP | 2017-072704 | A | 4/2017 |
| JP | 2017-182010 | A | 10/2017 |
| JP | 2019-032397 | A | 2/2019 |
| JP | 2020-183984 | A | 11/2020 |

* cited by examiner (a)

(b)

DEVELOPER ACCOMMODATING DEVICE, DEVELOPING DEVICE, CARTRIDGE AND IMAGE FORMING APPARATUS

This application is a divisional of application Ser. No. 18/241,315, filed Sep. 1, 2023, which is a divisional of application Ser. No. 17/741,548, filed May 11, 2022, now U.S. Patent No. 11,782,360, issued Oct. 10, 2023.

FIELD OF THE INVENTION AND RELATED ART

The present invention relates to a developer accommodating device which accommodates developer, a developing device which is provided with the developer accommodating device, a cartridge, and an image forming apparatus.

Conventionally, as described in Japanese Laid-Open Patent Application (JP-A) 2017-182010 (Patent Document 1), an image forming apparatus, which includes a toner cartridge and a developing unit which is possible to mount the toner cartridge, is proposed. The developing unit includes an opening for receiving toner which is supplied from the toner cartridge and a developer shutter for opening and closing the opening. The developer shutter moves from a closed position which closes the opening, to an opened position which opens the opening by an action that a user mounts the toner cartridge on the developing unit.

Recently, toner cartridges have been desired to increase a toner accommodating capacity. And the toner cartridge described in the Patent Document 1 has left room for increasing the toner accommodating capacity.

SUMMARY OF THE INVENTION

An object of the present invention is to provide a developer accommodating device which is possible to increase a toner accommodating capacity, a developing device, a cartridge, and an image forming apparatus.

The present invention is a developer accommodating device detachably mounted on a developing unit, the developer accommodating device comprising: a frame extending in a longitudinal direction thereof and configured to accommodate a developer; and an opening portion provided on the frame and through which the developer accommodated in the frame is discharged to an outside of the frame, wherein the frame includes a guide portion configured to be guided by the developing unit while the developer accommodating device is being mounted on the developing unit in a mounting direction crossing the longitudinal direction, a first portion including a first chamber, in which the opening is provided, and a second chamber which are aligned in a first direction perpendicular to the longitudinal direction, the first portion including a partition wall partitioning between the first chamber and the second chamber, and a second portion aligned with the first portion in the longitudinal direction and through which the first chamber of the first portion communicates with the second chamber of the first portion, and an accommodating volume of the second portion is larger than that of the first portion, wherein as seen in the longitudinal direction, a cross sectional area of the second chamber is equal to or larger than that of the first chamber.

Further features of the present invention will become apparent from the following description of exemplary embodiments with reference to the attached drawings.

Figure 17:
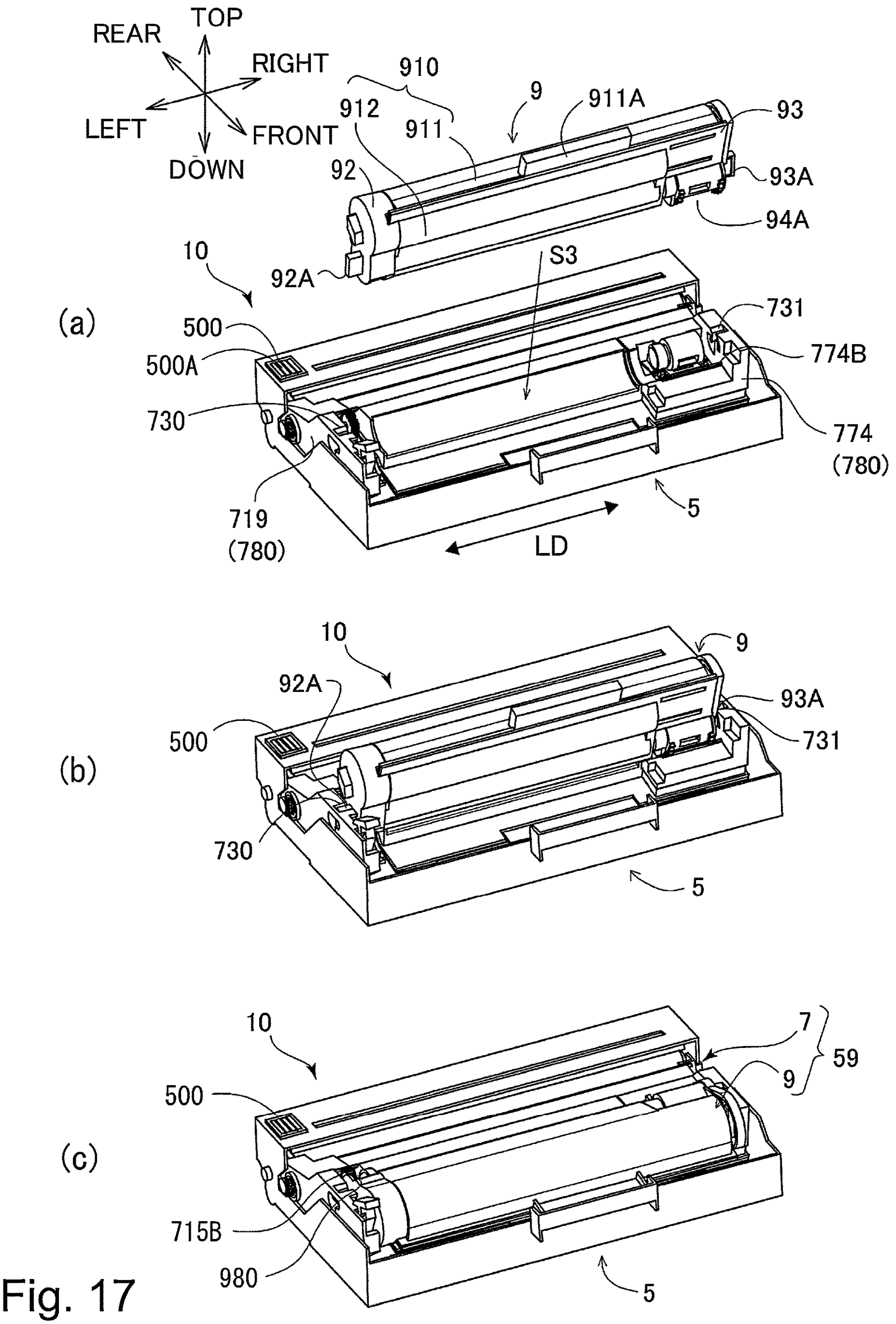

Part (a) of FIG. 17 is a perspective view showing the process cartridge, and the toner cartridge before being mounted on the process cartridge. Part (b) of FIG. 17 is a perspective view showing the toner cartridge during being mounted on the process cartridge. Part (c) of FIG. 17 is a perspective view showing the toner cartridge which has been mounted on the process cartridge.

Figure 18:
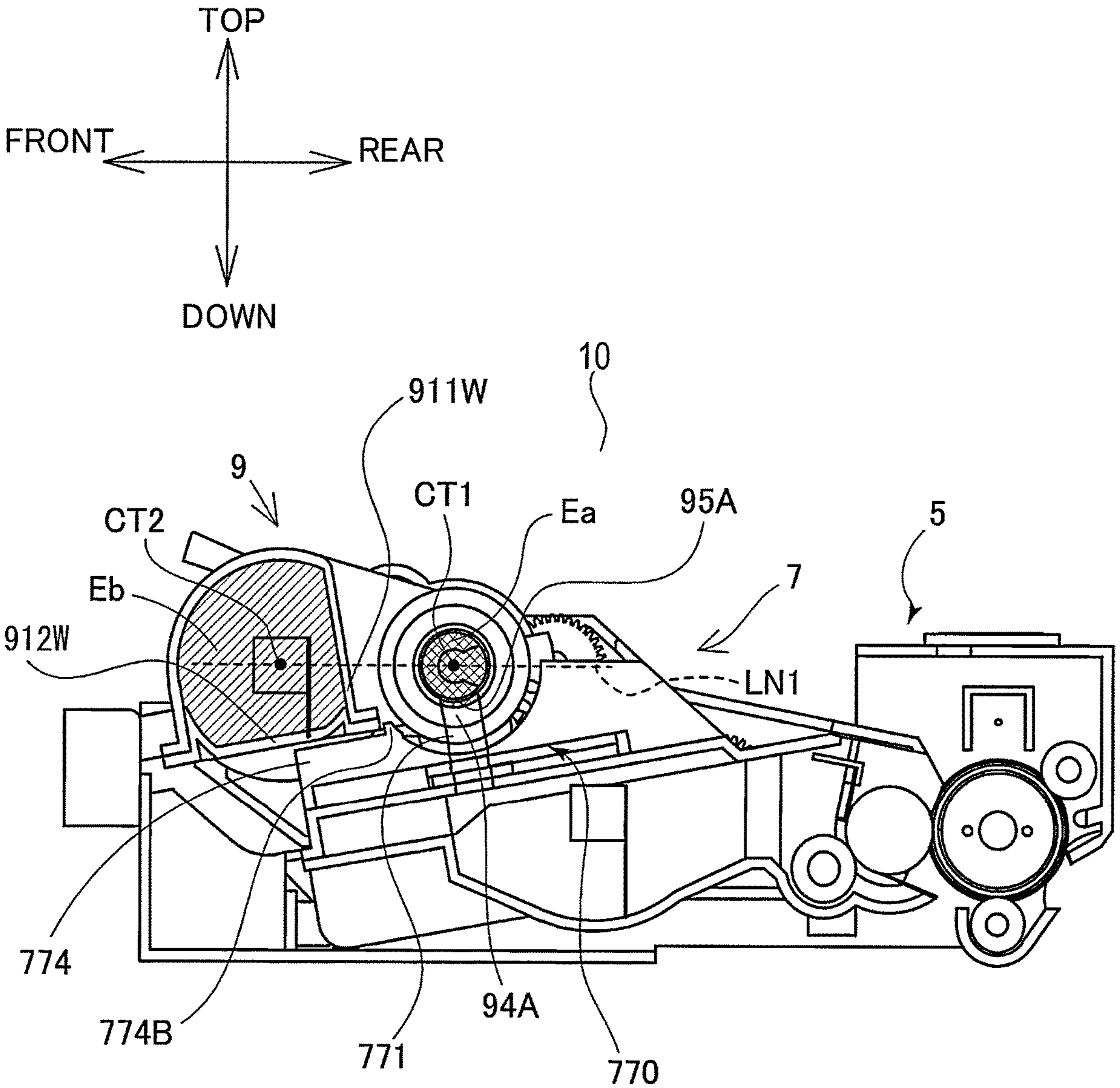

FIG. 18 is a sectional view of the toner cartridge which has been mounted on the process cartridge, viewed from right to left along the longitudinal direction.

Figure 19:
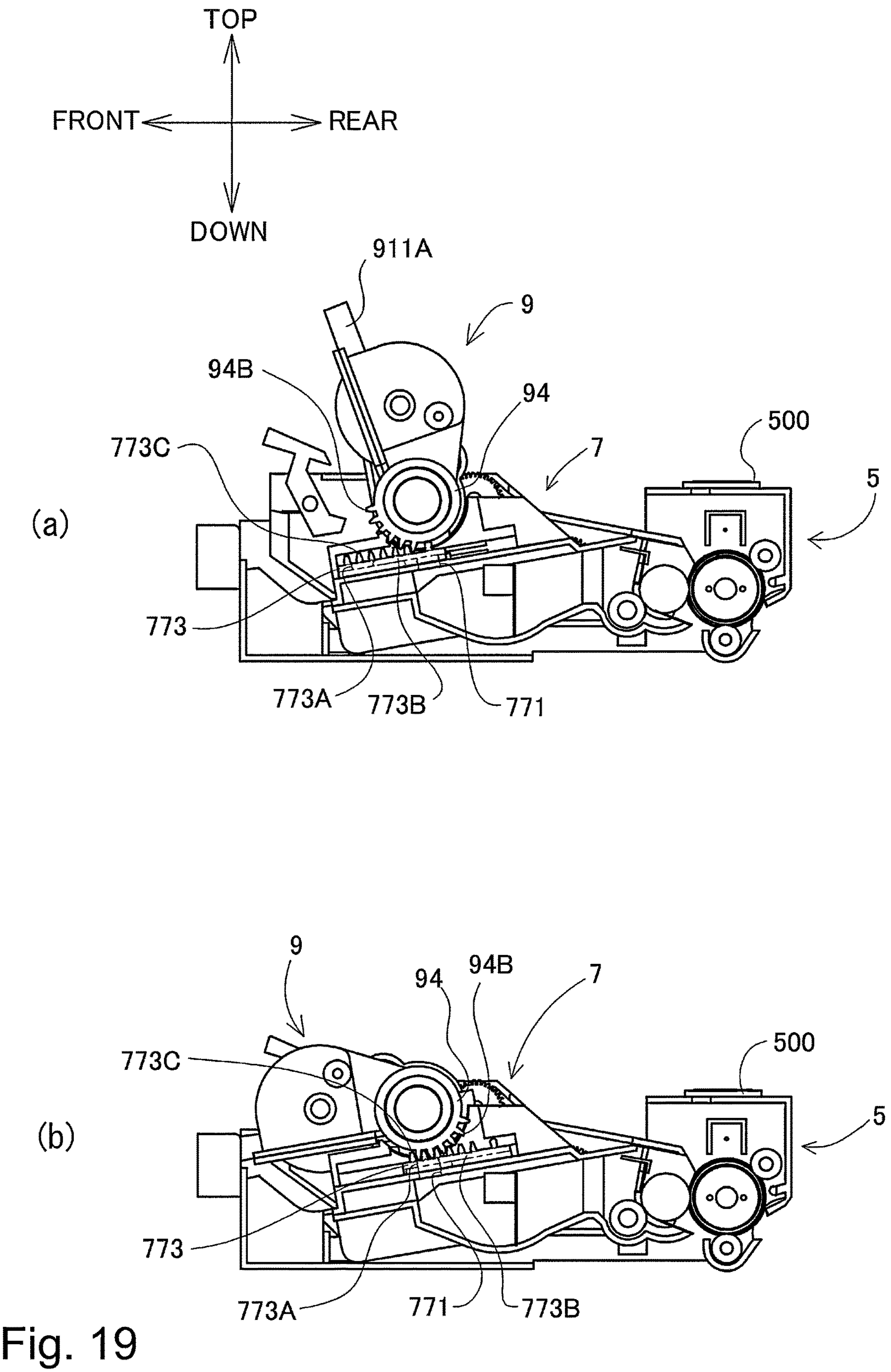

Part (a) of FIG. 19 shows a sectional view of the developing unit while a receiving side shutter is closed, and part (b) of FIG. 19 shows a sectional view of the developing unit while the receiving side shutter 773 is opened.

Figure 20:
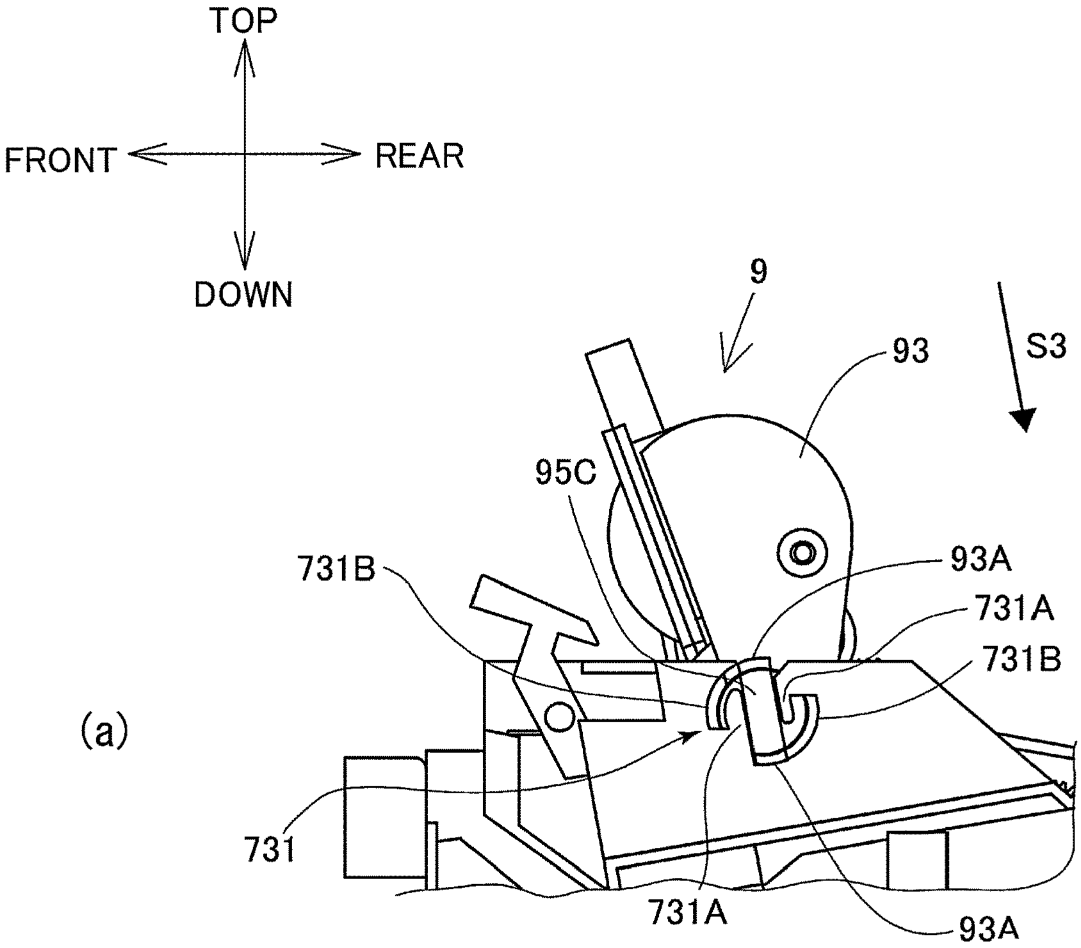
Figure 20:
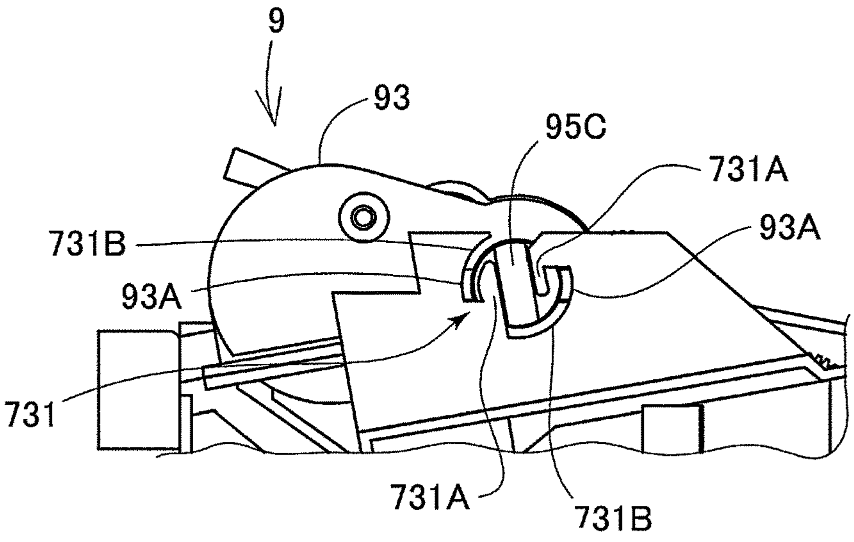

Part (a) of FIG. 20 is a side view showing a state that a discharging side shutter is closed and part (b) of FIG. 20 is a side view showing a state that the discharging side shutter is opened.

Figure 21:
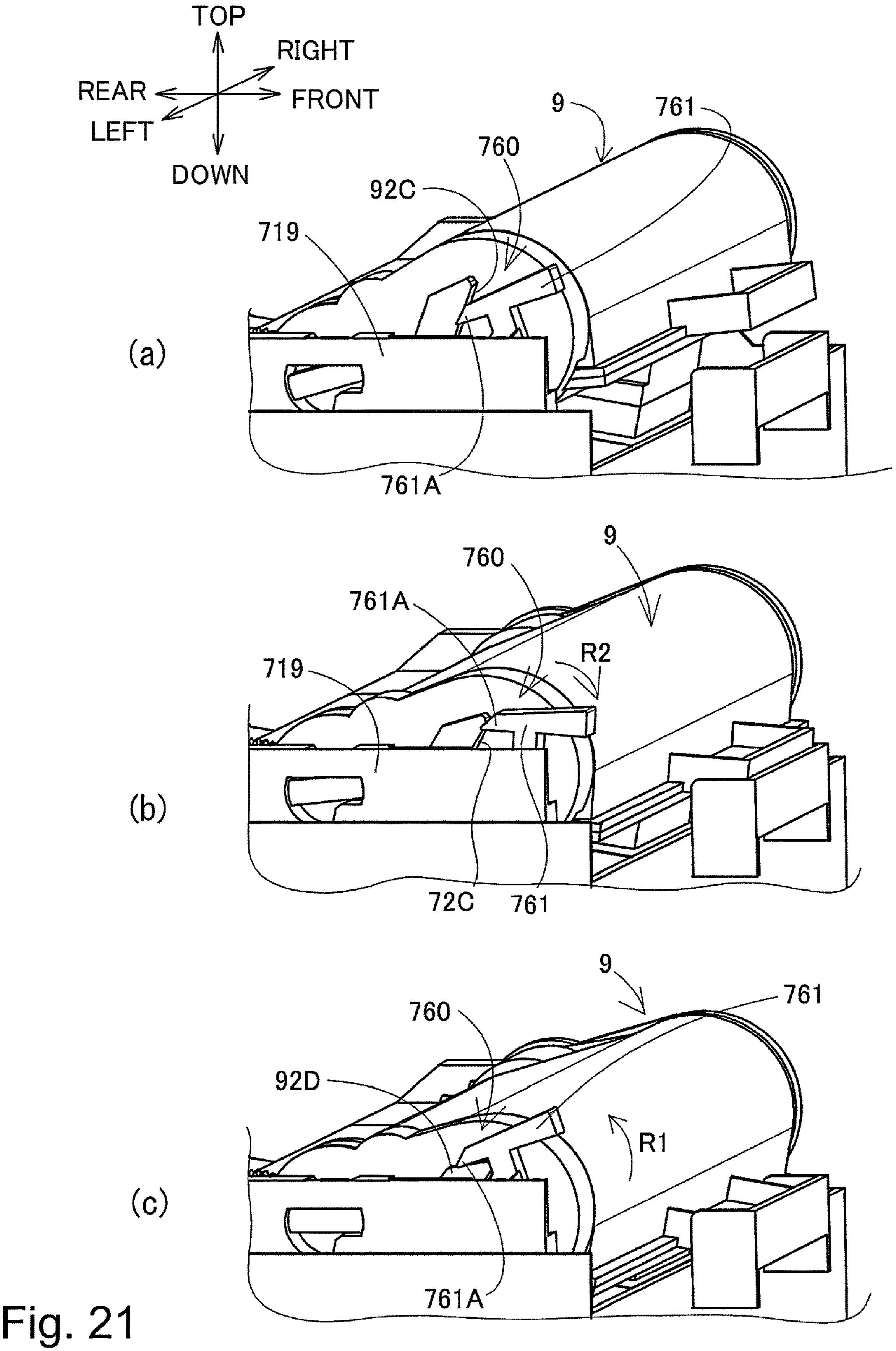

Part (a) of FIG. 21 is a perspective view showing a state that the toner cartridge is on a lift mechanism during a mounting process. Part (b) of FIG. 21 is a perspective view showing a state that the toner cartridge is opening the lift mechanism during the mounting process. Part (c) of FIG. 21 is a perspective view showing a state that the toner cartridge has been mounted.

Figure 22:
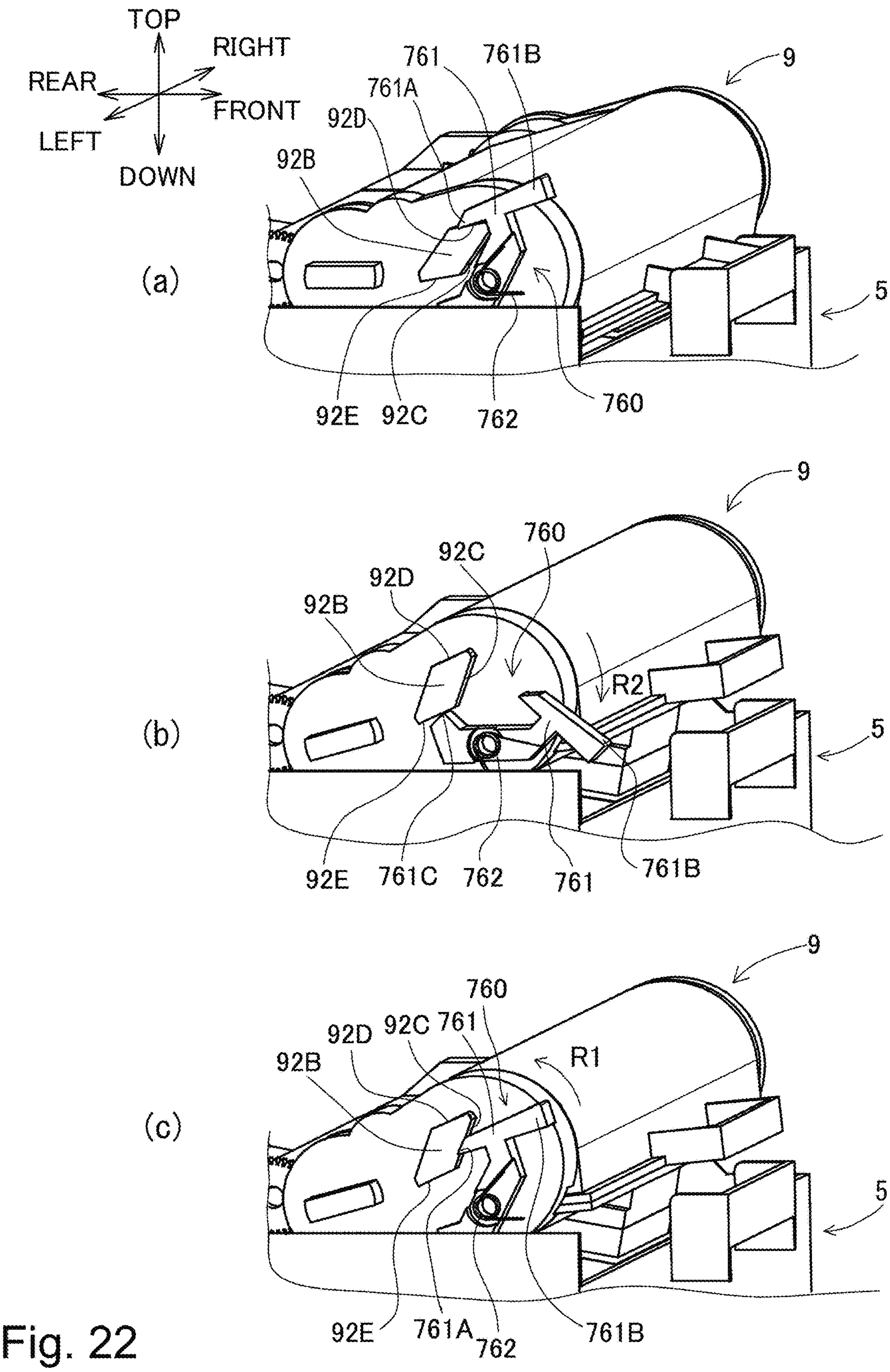

Part (a) of FIG. 22 is a perspective view showing a state that the toner cartridge has been mounted. Part (b) of FIG. 22 is a perspective view showing an appearance that the toner cartridge is being lifted up by the lift mechanism. Part (c) of FIG. 22 is a perspective view showing an appearance that the toner cartridge is in a lifted up state.

Figure 23:
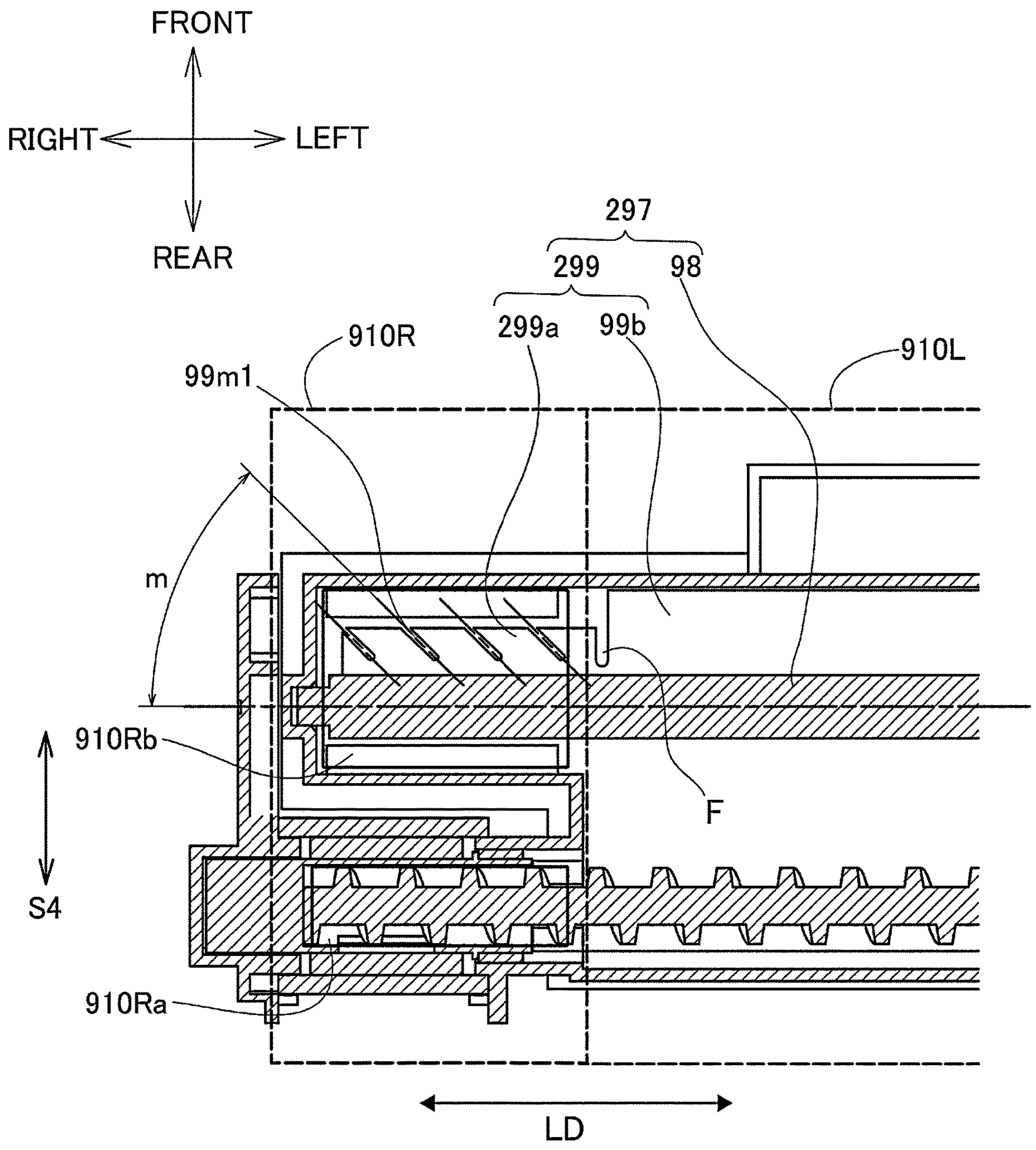

FIG. 23 is a sectional view showing a mixing member according to a second embodiment.

Figure 24:
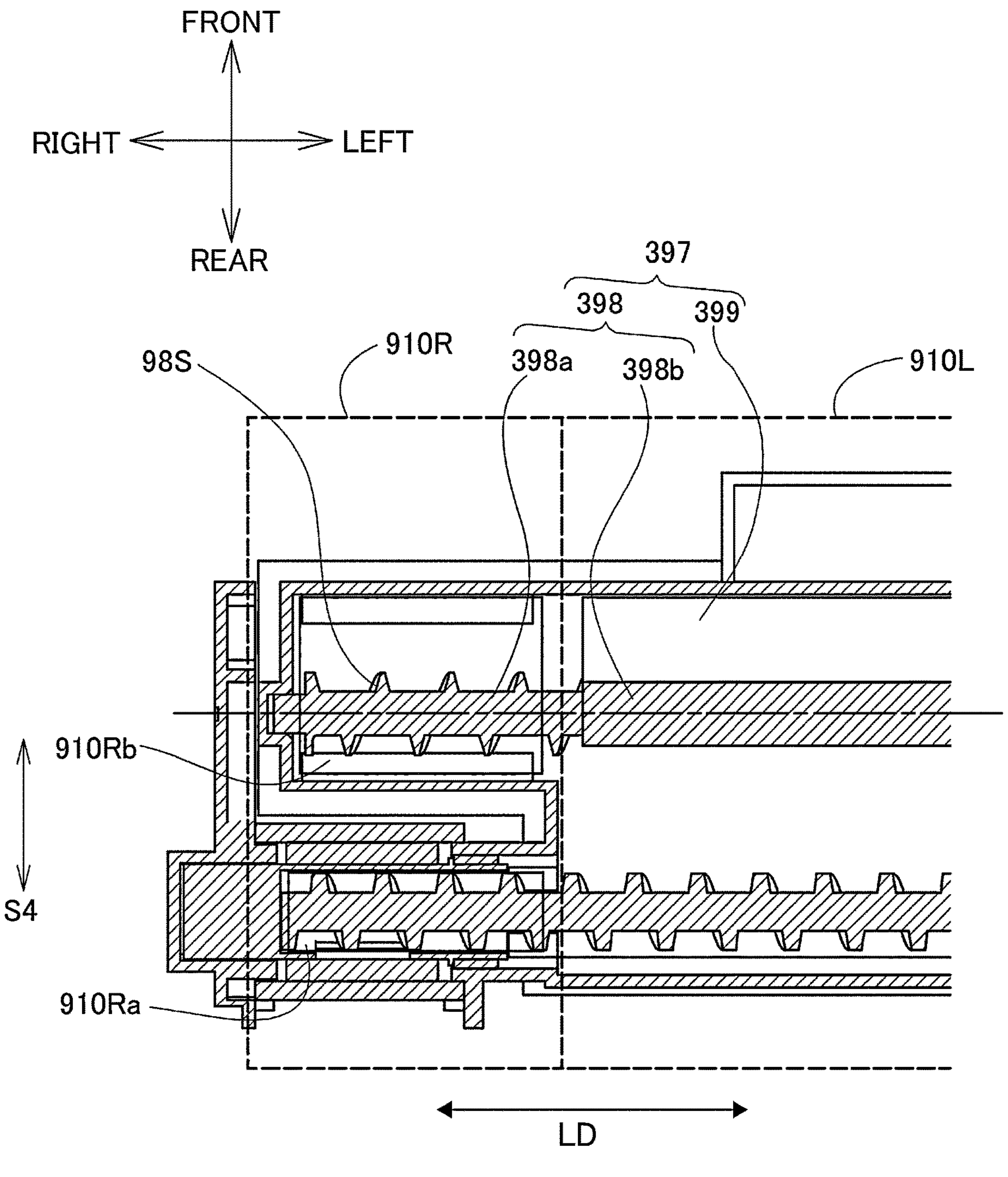

FIG. 24 is a sectional view showing a mixing member according to a third embodiment.

DESCRIPTION OF THE EMBODIMENTS

First Embodiment

First, a first embodiment of the present invention will be described. In a description below, directions are defined with respect to a user who uses an image forming apparatus 1. That is, a front side of the image forming apparatus 1 is "front", a rear side is "rear", a top (top surface) side is "top", and a bottom (bottom surface) side is "bottom". Further, a left side of the image forming apparatus 1 when the image forming apparatus is viewed from the front side is "left" and a right side is "right".

Figure 1:
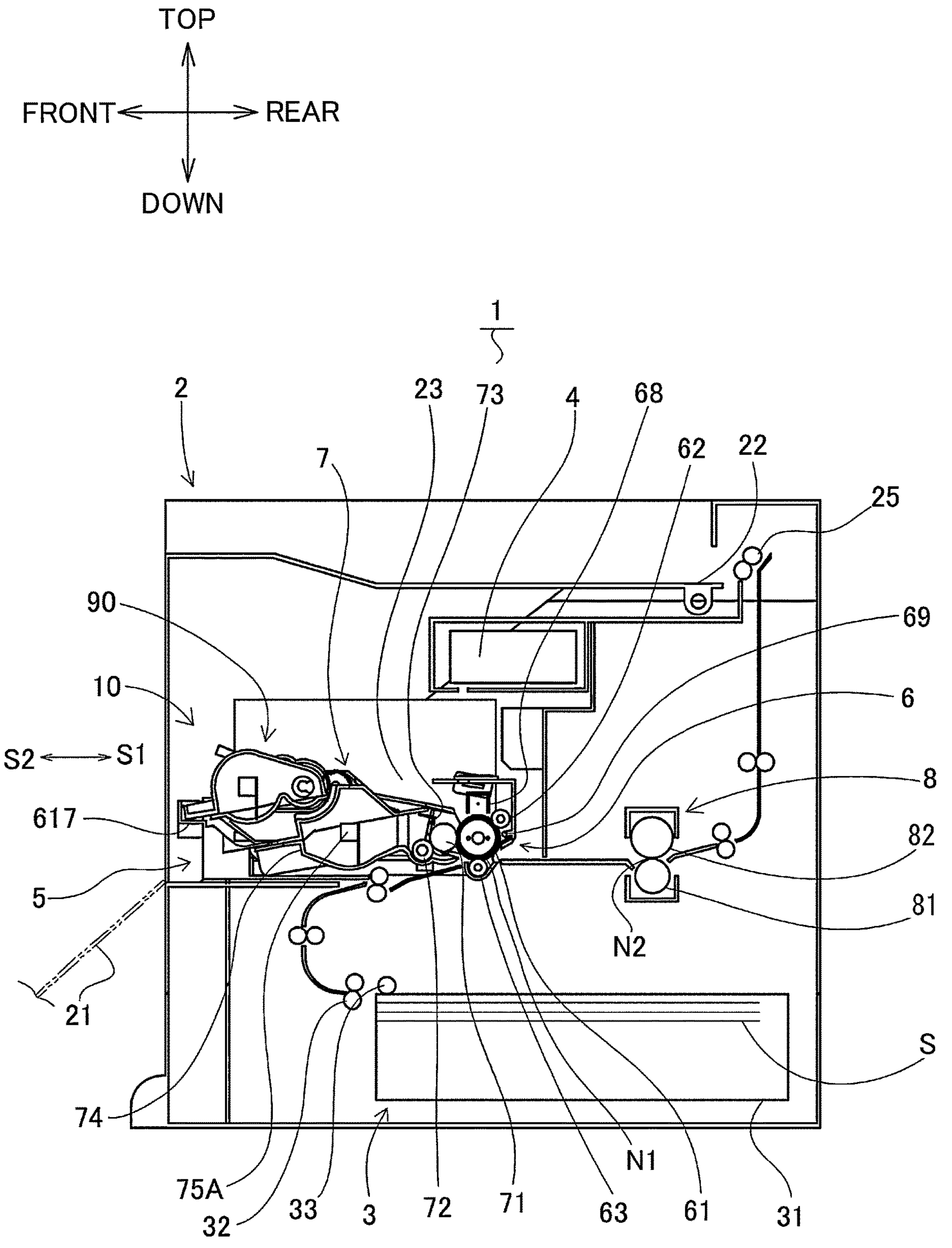
FIG. 1 is an overall schematic view showing an image forming apparatus according to a first embodiment.

Directions of the process cartridge 5 and the toner cartridge 9 as a developer accommodating device, which will be described later, are also defined in a same way as the image forming apparatus 1, as they are in a same position with a state that they are mounted on the image forming apparatus 1. Each direction in each figure is defined by arrows indicated in figures. For example, in FIG. 1, a left side of a drawing sheet of FIG. 1 is the front side. Further, an up-down direction is parallel to a vertical direction, and a right-left direction and a front-back direction are parallel to a horizontal direction. The right-left direction is parallel to a direction of a rotational axis of the photosensitive drum 61 and a direction of a rotational axis of a developing roller 71, respectively.

Further, the developing unit 7 which is mounted on a photosensitive member unit 6 and integrated into one is referred to as the process cartridge 5. Furthermore, the developing unit 7 on which the toner cartridge 9, which will be described below, is mounted is referred to as the developing device 59 (see part (c) of FIG. 17). Directions of an arrow S1 and an arrow S2 as an insertion direction and a removal direction when the process cartridge 5 is being mounted on a main assembly 2 of the image forming apparatus 1 is parallel to the front-back direction and perpendicular to the right-left direction and the up-down direction.

Further, the process cartridge 5 is also dismountably provided with the toner cartridge 9 for supplying the developer to the developing unit 7. The process cartridge 5 that the toner cartridge 9 is mounted on and integrated into one, that is, the developing device 59 which mounts the photosensitive member unit 6 and integrate into one, is referred to as a cartridge unit 10 as a cartridge.

[Overall Constitution]

The image forming apparatus 1 in the first embodiment is an electrophotographic laser beam printer. As shown in FIG. 1, the image forming apparatus 1 includes a feeding portion 3 which supplies a sheet S accommodated in a cassette 31, an image forming portion 90 which forms a toner image on the sheet S, a fixing device 8 which fixes the toner image on the sheet S, and a discharging roller pair 25.

The feeding portion 3 includes a cassette 31, a pickup roller 33 which feeds the topmost sheet S stored in the cassette 31, and a separation roller pair 32 that separates the sheet S fed by the pickup roller 33 into individual sheets.

The image forming portion 90 includes an exposure device 4 which is provided with the main assembly 2 of the image forming apparatus 1, and a cartridge unit 10 which is inserted in the direction of the arrow S1 and removed in the direction of the arrow S2 with respect to the main assembly 2. The cartridge unit 10 constitutes of a process cartridge 5 and a toner cartridge 9. The exposure device 4 includes a laser light emitting portion, a polygon mirror, a lens, and a reflector, which are not shown in the figures. In the exposure device 4, a laser light based on image data emitted from the laser light emitting portion is scanned at high speed on a surface of the photosensitive drum 61 of the process cartridge 5, and the surface of the photosensitive drum 61 is exposed.

The cartridge unit 10 is arranged below the exposure device 4 and is inserted and removed from the main assembly 2 while a door 21 of the main assembly 2 is opened. That is, the cartridge unit 10 is inserted into an accommodating portion 23 of the main assembly 2 in the direction of the arrow S1 and is mounted on the main assembly 2. Further, the cartridge unit 10 is removed from the main assembly 2 by pulling it out in the direction of the arrow S2 from the main assembly 2.

The process cartridge 5 of the cartridge unit 10 mainly includes the photosensitive member unit 6 and the developing unit 7. The photosensitive member unit 6 includes a photosensitive drum 61 as a rotatable image bearing member, a corona charger 68, a pre-exposure portion 69, a collecting roller 62, a transfer roller 63, etc. The photosensitive drum 61 and the transfer roller 63 form a transfer nip N1. The developing unit 7 includes a developing roller 71, a supplying roller 72, a blade 73, a toner accommodating portion 74 which accommodates the developer including the toner, a first agitator 75A which is provided in the toner accommodating portion 74, etc.

Incidentally, the developer in the embodiment constitutes a non-magnetic single component developer, however, a single component developer which includes a magnetic component may also be used. Further, the single component developer may include additives (for example, a wax and a silica microparticle) for adjusting toner flowability and charging performance, other than toner particles. Further, a two component developer which constitutes a non-magnetic toner and a magnetic carrier may also be used as a developer. In a case of using a magnetic developer, as a developer carrying member, for example, a cylindrical developing sleeve in which a magnet is arranged inside is used.

The developing roller 71 as a developer carrying member carries the developer and rotates, as well as develops an electrostatic latent image borne on the photosensitive drum 61 into a toner image. That is, the photosensitive drum 61 carries a toner image as a developing image. The fixing device 8 as a fixing portion is arranged behind the process cartridge 5 and includes a pressure roller 81 and a heating roller 82. The heating roller 82 incorporates a heat source such as a ceramic heater.

Figure 8:
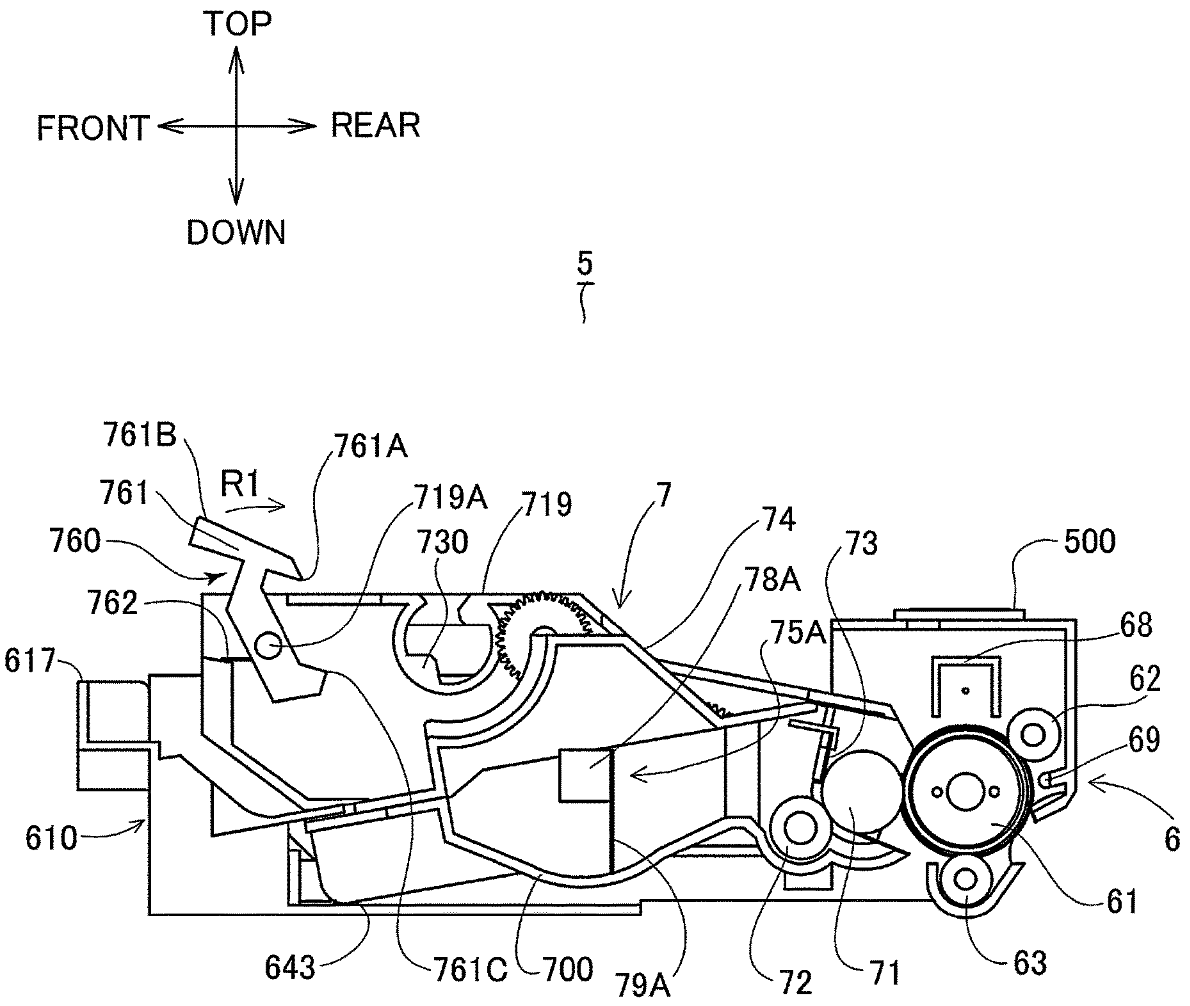
FIG. 8 is a sectional view showing the process cartridge.

When an image forming command is output to the image forming apparatus 1, an image forming process by the image forming portion 90 is started, based on image information input from an external computer which is connected to the image forming apparatus 1 or an image reading device etc. which is connected as an option. As shown in FIG. 1 and FIG. 8, the photosensitive drum 61 is rotationally driven during executing an image forming process. The photosensitive drum 61 is uniformly charged in advance by the corona charger 68, and the exposure device 4 emits a laser light toward the photosensitive drum 61 based on the input image information. The surface of the photosensitive drum 61 is exposed by emitting the laser light and an electrostatic latent image is formed on the photosensitive drum 61.

On the other hand, the developer in the toner accommodating portion 74 of the developing unit 7 is mixed by the first agitator 75A and then supplied to the developing roller 71 by the supplying roller 72. The developer supplied to the developing roller 71 by the supplying roller 72 passes through a gap between the developing roller 71 and the blade 73, and is carried onto the developing roller 71 with a constant layer thickness. By supplying the toner on the developing roller 71 to the electrostatic latent image formed on the photosensitive drum 61, the electrostatic latent image is developed and a toner image is formed on the photosensitive drum 61.

In parallel with the image forming process described above, the sheet S stacked in cassette 31 is fed by a pickup roller 33. The sheet S fed by the pickup roller 33 is separated one by one by a separating roller pair 32 and fed to the transfer nip N1. At the transfer nip N1, a transfer bias is applied to the transfer roller 63, and the toner image formed on the photosensitive drum 61 is transferred to the sheet S. The sheet S onto which the toner image is transferred in the transfer nip N1 is heated and pressurized by a fixing nip N2 which is formed by the pressure roller 81 and the heating roller 82 and the toner image is fixed. And the sheet S on which the toner image is fixed is discharged to a discharging tray 22 by the discharging roller pair 25.

The corona charger 68 described above is a charging unit which electrically charges the surface of the photosensitive drum 61 in a contactless way. The pre-exposure portion 69, which is provided with a light emitting diode as a light source and a light guide as a light guiding member, guides light which is emitted from the light emitting diode and irradiates the surface of the photosensitive drum 61. An electric current which is supplied to the light emitting diode is supplied from the main assembly 2. Static electricity on the surface of the photosensitive drum 61 is removed by the irradiation of light from the pre-exposure portion 69. Further, a predetermined voltage is applied to the collecting roller 62 from the main assembly 2 to collect paper dust, dirt, and other foreign matter and toner which adhere to the surface of the photosensitive drum 61.

[Process Cartridge]

Figure 2:
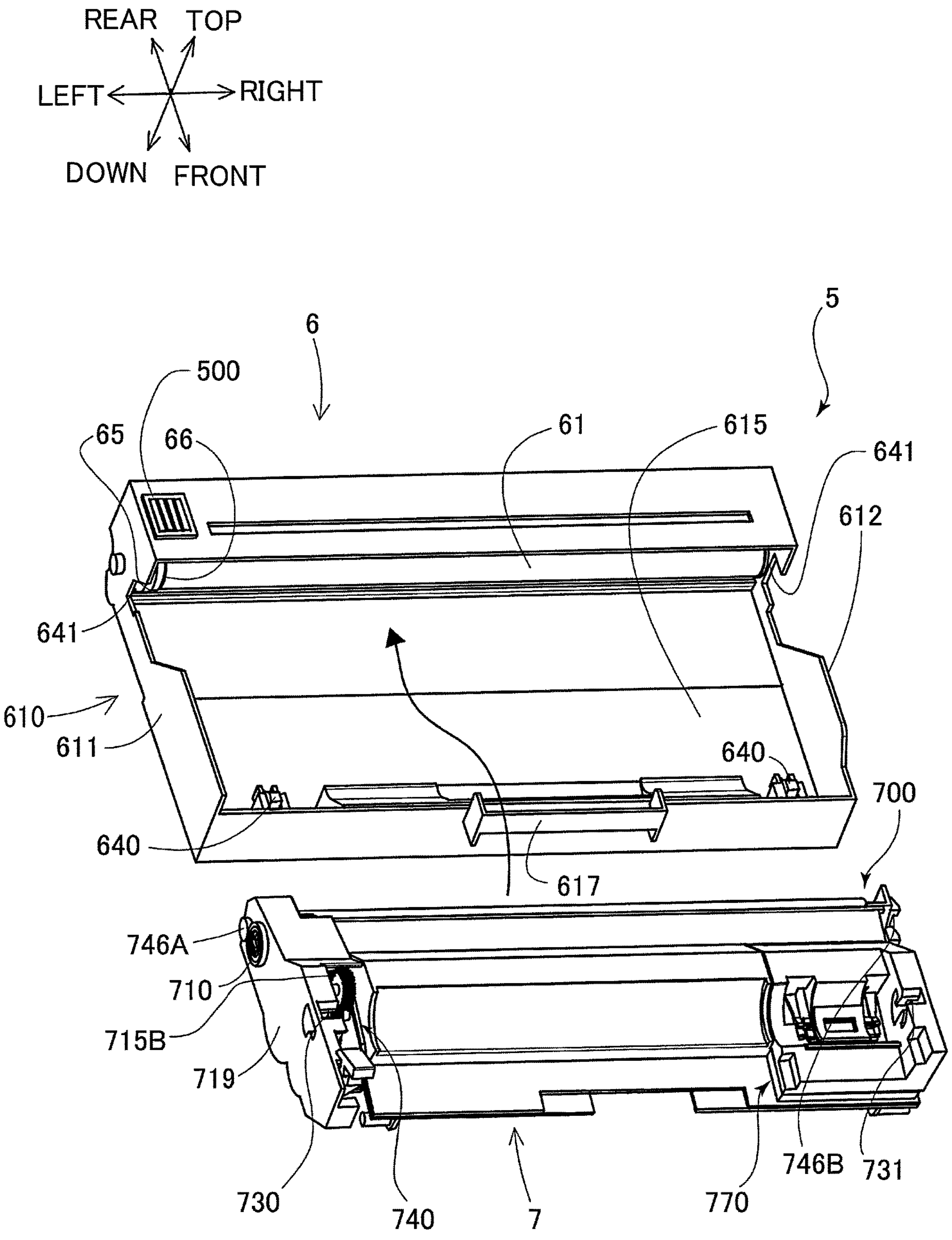
FIG. 2 is an exploded perspective view showing a process cartridge.

FIG. 2 is an exploded perspective view showing the process cartridge 5. As shown in FIG. 2, the process cartridge 5 includes the photosensitive member unit 6 and the developing unit 7 which is dismountably supported by the photosensitive member unit 6. The developing unit 7 is mounted on the photosensitive member unit 6 while it is held by a user.

[Developing Unit]

Figure 3:
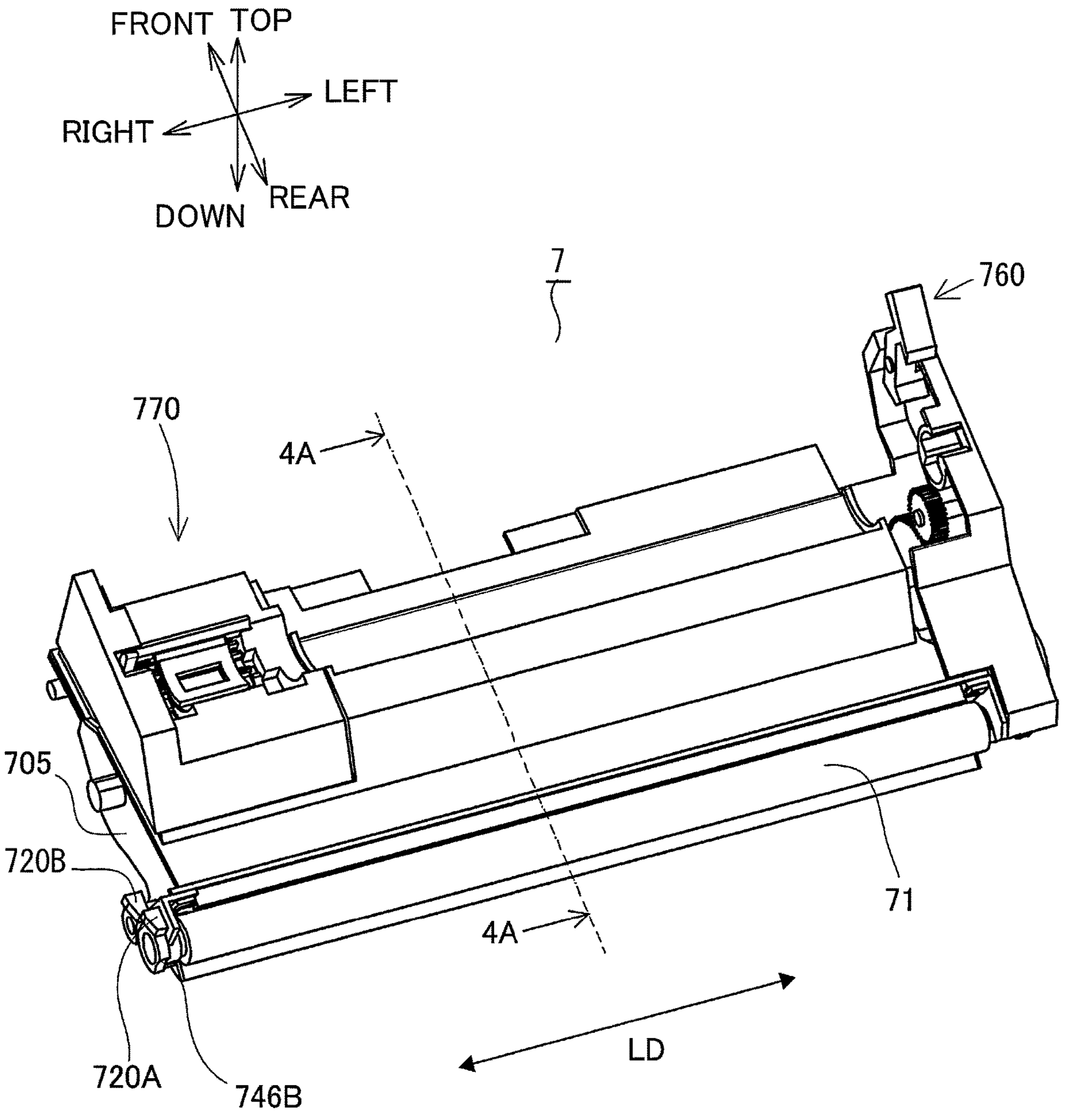
FIG. 3 is a perspective view showing a developing unit.
Figure 4:
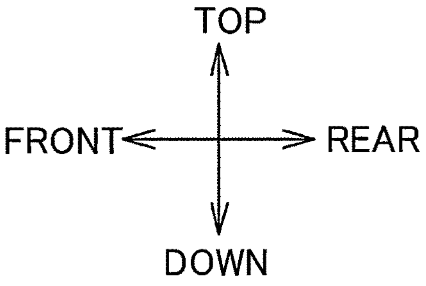
FIG. 4 is a sectional view along line 4A-4A in FIG. 3.
Figure 4:
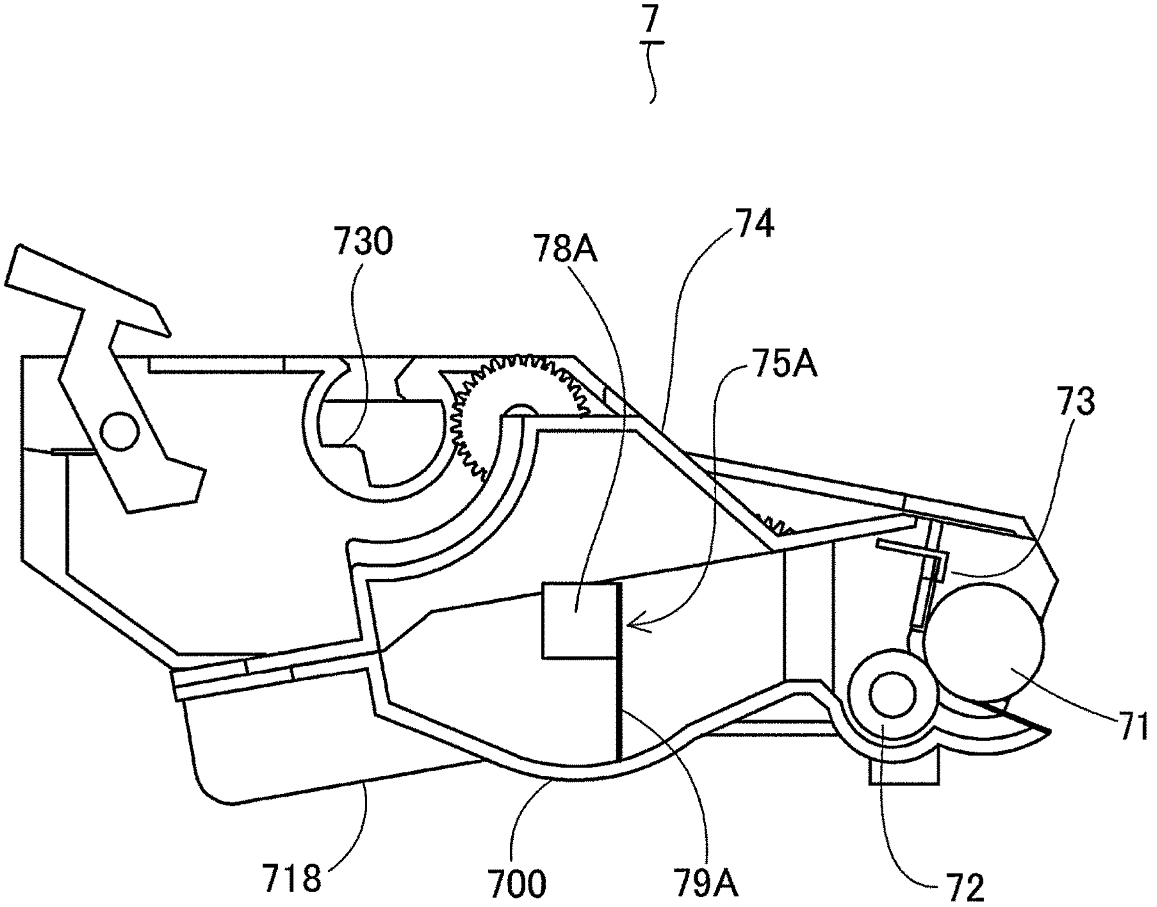
Figure 5:
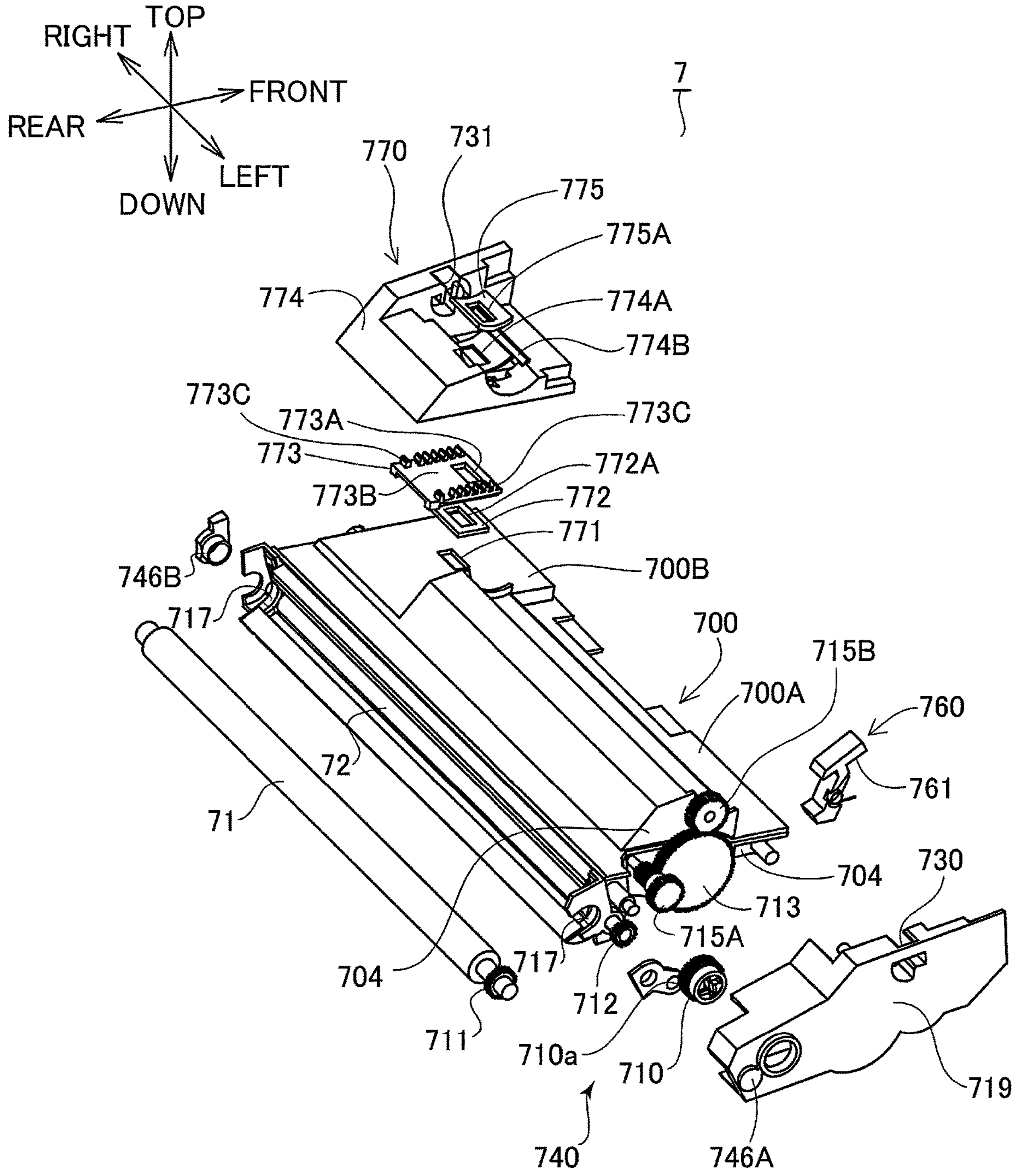
FIG. 5 is an exploded perspective view showing the developing unit.
Figure 6:
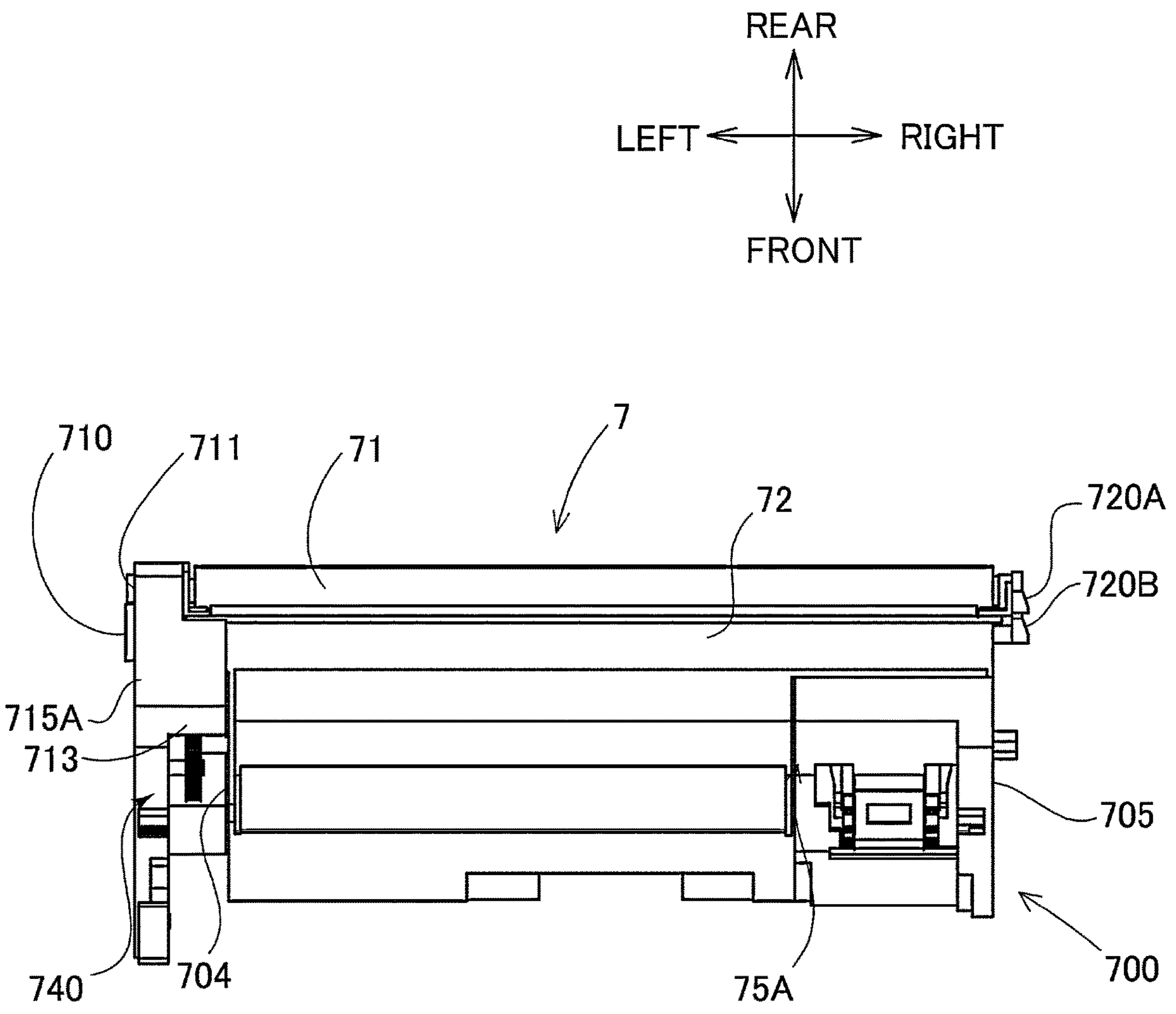
FIG. 6 is a plan view showing the developing unit while a top of a casing is removed.
Figure 7:
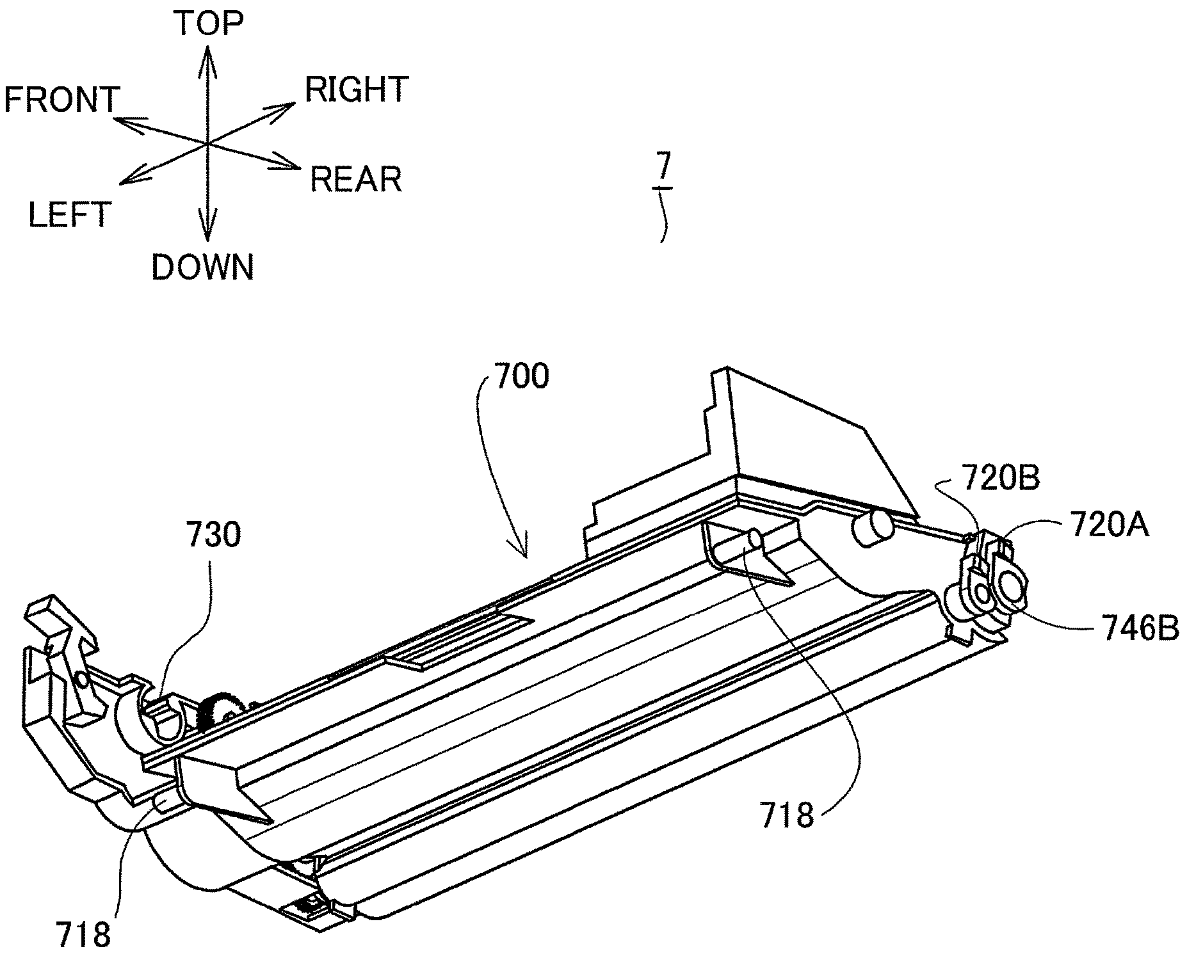
FIG. 7 is a perspective view of the developing unit viewed from a bottom side.

First, a constitution of the developing unit 7 will be described in FIG. 2 through FIG. 7. FIG. 3 is a perspective view showing the developing unit 7, and FIG. 4 is a sectional view showing along line 4A-4A of FIG. 3. FIG. 5 is an exploded perspective view of the developing unit 7. FIG. 6 is a plan view showing the developing unit 7 while a top of a casing 700 is removed. FIG. 7 is a perspective view of the developing unit 7 when it is viewed from a bottom side.

The developing unit 7 includes the casing 700, the developing roller 71, the supplying roller 72, the first agitator 75A, a driving train 740, a side holder 719, a toner receiving portion 770, and the lift mechanism 760, as shown in FIG. 2 through FIG. 5. The casing 700 includes a left side wall 704 and a right side wall 705 which rotatably support both ends of the developing roller 71, the supplying roller 72, and the first agitator 75A, respectively. The side holder 719 covers the driving train 740 and is supported by the left side wall 704.

The toner receiving portion 770 includes a toner receiving port 771 which is provided on a right side top surface 700B, which is opposite from a left side top surface 700A, of the casing 700 and receives toner which is supplied by the toner cartridge 9 as will be described below. The lift mechanism 760 holds and lifts up the toner cartridge 9. Hereinafter, a direction of a rotational axis of the developing roller 71 is referred to as an axial direction.

The first agitator 75A includes a mixing rod 78A and a mixing sheet 79A and one end portion of the mixing sheet 79A is fixed to the mixing rod 78A. The other end portion of the mixing sheet 79A is a free end, and the mixing sheet 79A mixes the developer in a radial direction which is perpendicular to the axial direction. In this way, it is possible to use the toner in the toner accommodating portion 74 efficiently. The developer is supplied to the supplying roller 72 by the mixing sheet 79A.

The developing roller 71 is rotatably supported by a bearing 746A and receiving surface 717 which is are provided in the side holder 719 and a bearing 746B and receiving surface 717 which is are fixed to the right side wall 705 of the casing 700. As shown in FIG. 3, the developing unit 7 includes a first contact 720A and a second contact 720B which is arranged in a vicinity of the bearing 746B. The first contact 720A is electrically connected to the developing roller 71, and a voltage applied to the developing roller 71 is supplied from the main assembly 2. The second contact 720B is electrically connected to the supplying roller 72, and a voltage applied to the supplying roller 72 is supplied from the main assembly 2. The first contact 720A and the second contact 720B are possible to contact an unshown electric power supply contact which is provided with the main assembly 2.

As shown in FIG. 5 and FIG. 6, the driving train 740 which is provided on a left side of the developing unit 7 includes a developing coupling 710, a supplying roller gear 712, a developing roller gear 711, a first agitator gear 713, an idle gear 715A, and an idle gear 715B.

The developing coupling 710 is rotatably supported by the left side wall 704 of the developing unit 7, and an unshown driving transmission member which is provided with the main assembly 2 engages the developing coupling 710 in association with a closing operation of the door 21 (see FIG. 1) in the main assembly 2. On the other hand, the driving transmission member is separated from the developing coupling 710 in association with an opening operation of the door 21. The driving transmission member is constituted so that it is possible to transmit a driving force to the developing coupling 710 while it allows positional deviation of the development coupling 710 within a predetermined range. Further, the developing coupling 710, the developing roller gear 711, and the supplying roller gear 712 are regulated from moving in the axial direction by the side holder 719.

After the door 21 is closed, when the main assembly 2 operates, the driving force is transmitted from the driving transmission member to the developing coupling 710, and a gear 710*a*, which is provided on a periphery surface of the developing coupling 710, rotates. The gear 710*a* is meshed with the developing roller gear 711 which is provided at an end portion of the developing roller 71 and the supplying roller gear 712 which is provided at an end portion of the supplying roller 72, and when the gear 710*a* rotates, the developing roller 71 and the supplying roller 72 rotate.

Further, the gear 710*a* of the developing coupling 710 is meshed with the first agitator gear 713 via the idle gear 715A, and the first agitator 75A rotates when the first agitator gear 713 rotates. Furthermore, the first agitator gear 713 is meshed with a feeding screw gear 980 (see FIG. 12), as will described below, via the idle gear 715B. Furthermore, as shown in FIG. 7, a pair of a boss 718 and a boss 718 which is protruding in the axial direction at a bottom of the developing unit 7.

[Photosensitive Member Unit]

Next, a detailed constitution of the photosensitive member unit 6 will be described in FIG. 8 through FIG. 11. FIG. 8 is a sectional view showing the process cartridge 5 which includes the photosensitive member unit 6 and the developing unit 7.

Figure 9:
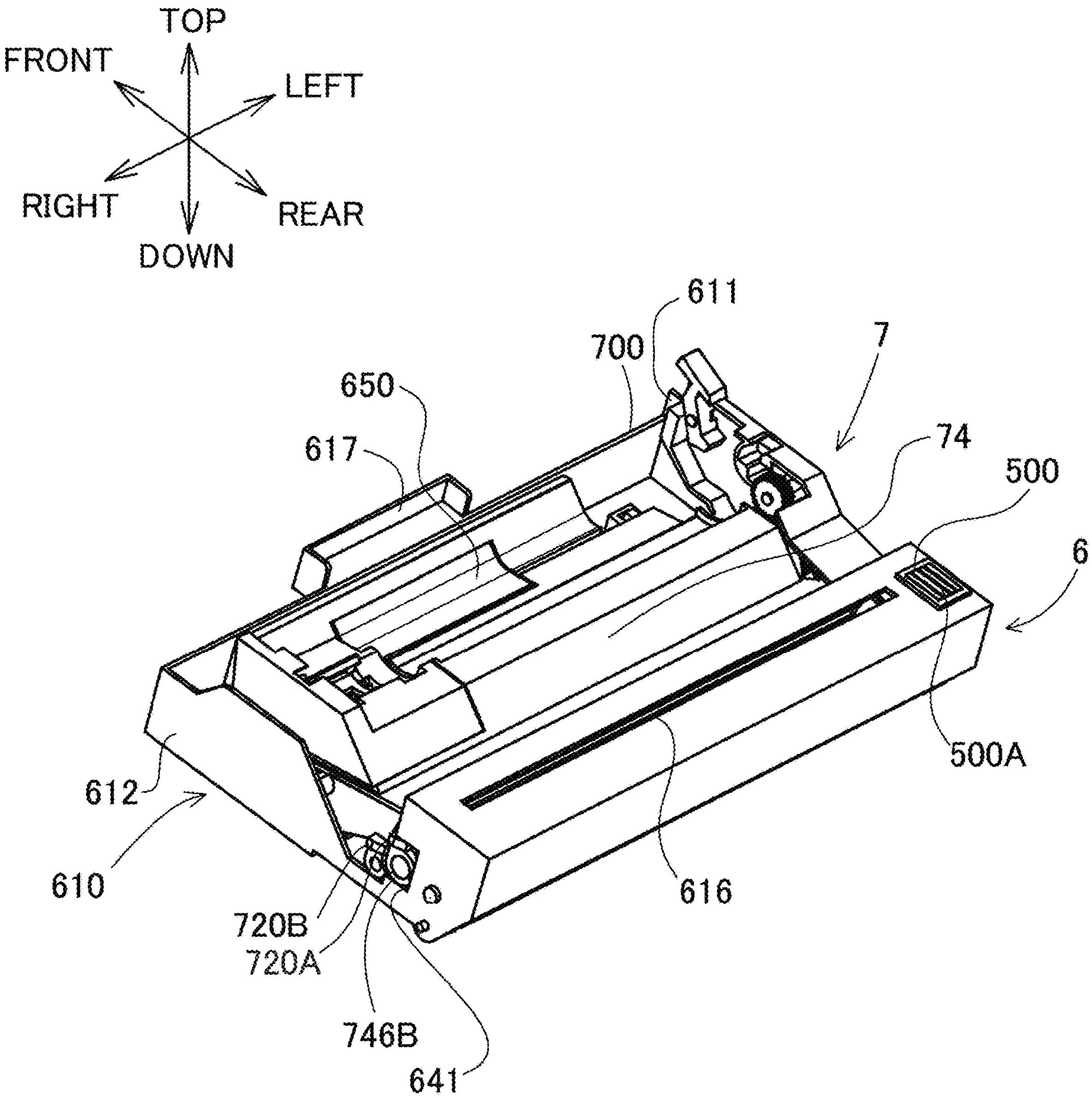
FIG. 9 is a perspective view showing a photosensitive member unit while the developing unit is mounted.
Figure 10:
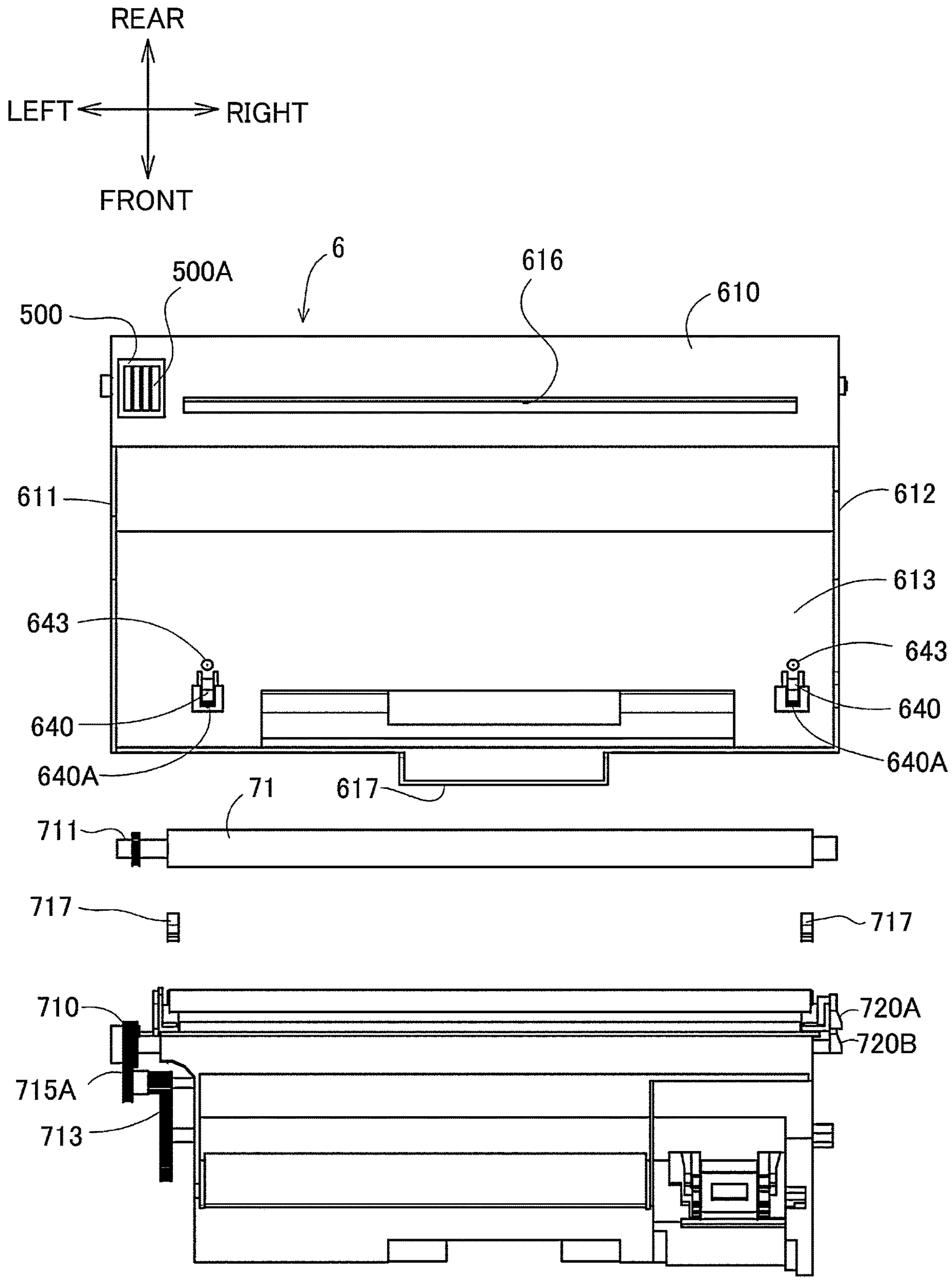
FIG. 10 is an exploded plan view showing the photosensitive member unit and the developing unit.
Figure 11:
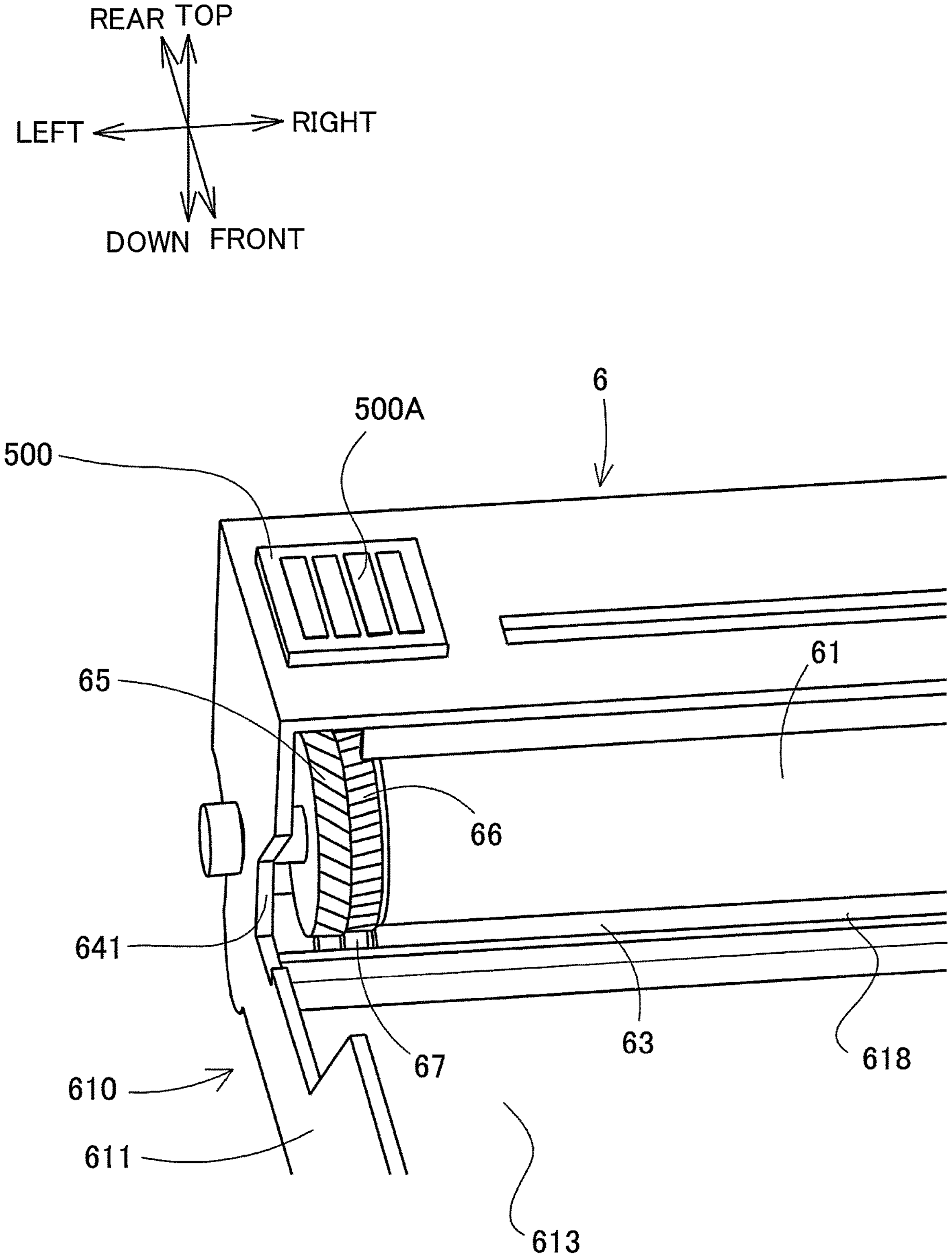
FIG. 11 is a partial perspective view of the photosensitive member unit.

FIG. 9 is a perspective view showing the photosensitive member unit 6 while the developing unit 7 is mounted. FIG. 10 is an exploded plan view showing the photosensitive member unit 6 and the developing unit 7. FIG. 11 is a partial perspective view of the photosensitive member unit 6.

As shown in FIG. 2 and from FIG. 8 through FIG. 11, the photosensitive member unit 6 mainly includes a frame 610 and the photosensitive drum 61 which is rotatably supported behind the frame 610. The frame 610 includes a pair of a left side wall 611 and a right side wall 612, and the photosensitive drum 61 is rotatably supported by the left side wall 611 and the right side wall 612.

In a front portion of the frame 610, a mounting portion 615 (see FIG. 2) in which the developing unit 7 is possible to be mounted, a holding portion 617 in which a user holds the photosensitive member unit 6, a pair of left and right pressing members 640 which presses the developing unit 7 forward, and a pressing member 650 are provided. In a state that the developing unit 7 is mounted on the photosensitive member unit 6, the toner accommodating portion 74 of the developing unit 7 is arranged between the left side wall 611 and the right side wall 612, and a removal of the developing unit 7 is regulated by the pressing member 650.

In an upper rear side of the frame 610, a laser passage hole 616, which is possible to pass through a laser light emitted from the exposure device 4, is formed, and, in addition, a memory 500 is mounted. The memory 500 includes an unshown memory chip which stores information about the process cartridge 5 and a memory electrode 500A which is electrically connected with the memory chip. The memory electrode 500A contacts an unshown electrode which is provided with the main assembly 2 and communicates between the memory chip and the main assembly 2, when the process cartridge 5 is mounted on the main assembly 2. The information about the process cartridge 5 in which the memory chip stores includes information about time to replace the photosensitive drum 61, information about time to replace the developing unit 7, and information about a remaining amount of toner which is accommodated in the developing unit 7.

In the left side wall 611 and the right side wall 612 of the frame 610, a receiving portion 641 is formed, and the receiving portion 641 is constituted so that it is possible to urge the bearing 746A and the bearing 746B of the developing unit 7. The receiving portion 641 is formed in a substantially U-shape with an open in front and supports the developing unit 7.

Further, on a bottom surface 613 of the frame 610, a sheet passing hole 618 through which a sheet passes when it is fed to the transfer nip N1, and two protrusion portions 643 and 643 which are protruded upward. The protrusions 643 and 643 support the developing unit 7 by urging a pair of bosses 718 and 718 which are formed on a bottom surface of the developing unit 7.

As shown in FIG. 11, a first photosensitive member gear 65 and a second photosensitive member gear 66 are provided at a left end portion of the photosensitive drum 61, and a transfer gear 67 which meshes with the second photosensitive gear 66 is provided at a left end portion of the transfer roller 63. When the process cartridge 5 which includes the photosensitive member unit 6 is mounted on the main assembly 2, the driving gear which is provided with the main assembly 2 meshes with the first photosensitive member gear 65. When the driving gear rotates in the state, the first photosensitive member gear 65 rotates by the driving gear, and the photosensitive drum 61 and the second photosensitive member gear 66 rotate integrally with the first photosensitive member gear 65. And a rotation of the second photosensitive member gear 66 is transmitted to the transfer gear 67, and the transfer roller 63 rotates integrally with the transfer gear 67.

Furthermore, as shown in FIG. 2 and FIG. 10, a pair of the pressing members 640 are provided in a front portion of the frame 610 of the photosensitive member unit 6. The pressing member 640 is urged forward by a compression spring 640A and presses the casing 700 of the developing unit 7 while the developing unit 7 is mounted on the photosensitive member unit 6. Thus, the developing roller 71 of the developing unit 7 is urged against the photosensitive drum 61.

Since the photosensitive member unit 6 is constituted as described above, when the developing unit 7 is mounted to the photoconductor unit 6 as shown in FIG. 2, the bearings 746A and 746B of the developing unit 7 butt against the receiving portion 641.

In this state, when a user releases a hand from the developing unit 7, the developing unit 7 is supported by the protrusions 643 and 643 which are formed on a bottom surface 613 of the photosensitive member unit 6 and also urged by the pressing member 640. By an urging force of the compression spring 640A which urges the pressing member 640, the bearings 746A and 746B of the developing unit 7 are urged against the receiving portion 641, and the developing unit 7 is positioned in the front-back direction with respect to the photosensitive member unit 6.

[Constitution of Toner Cartridge]

Figure 12:
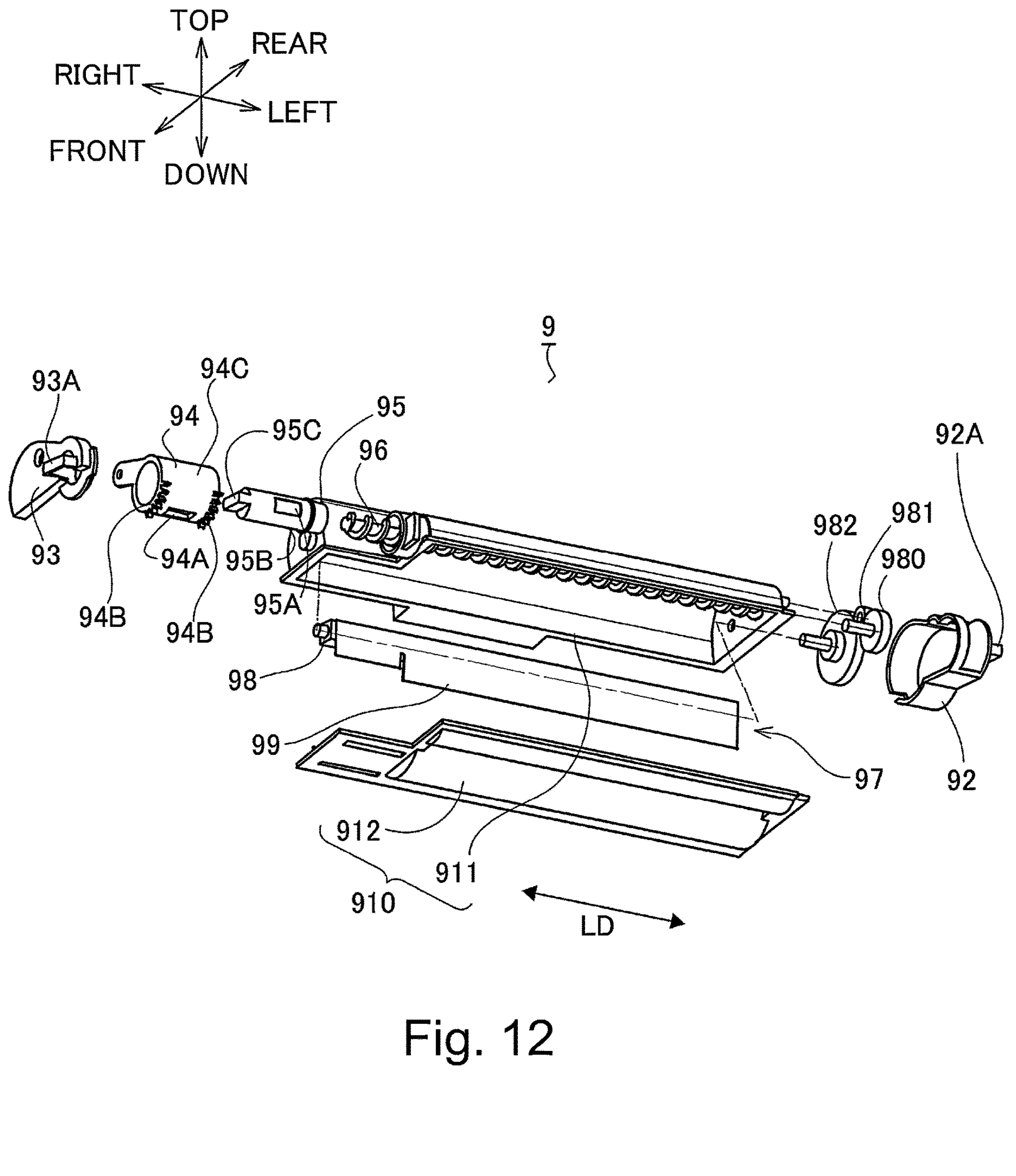
FIG. 12 is an exploded perspective view showing a toner cartridge.
Figure 13:
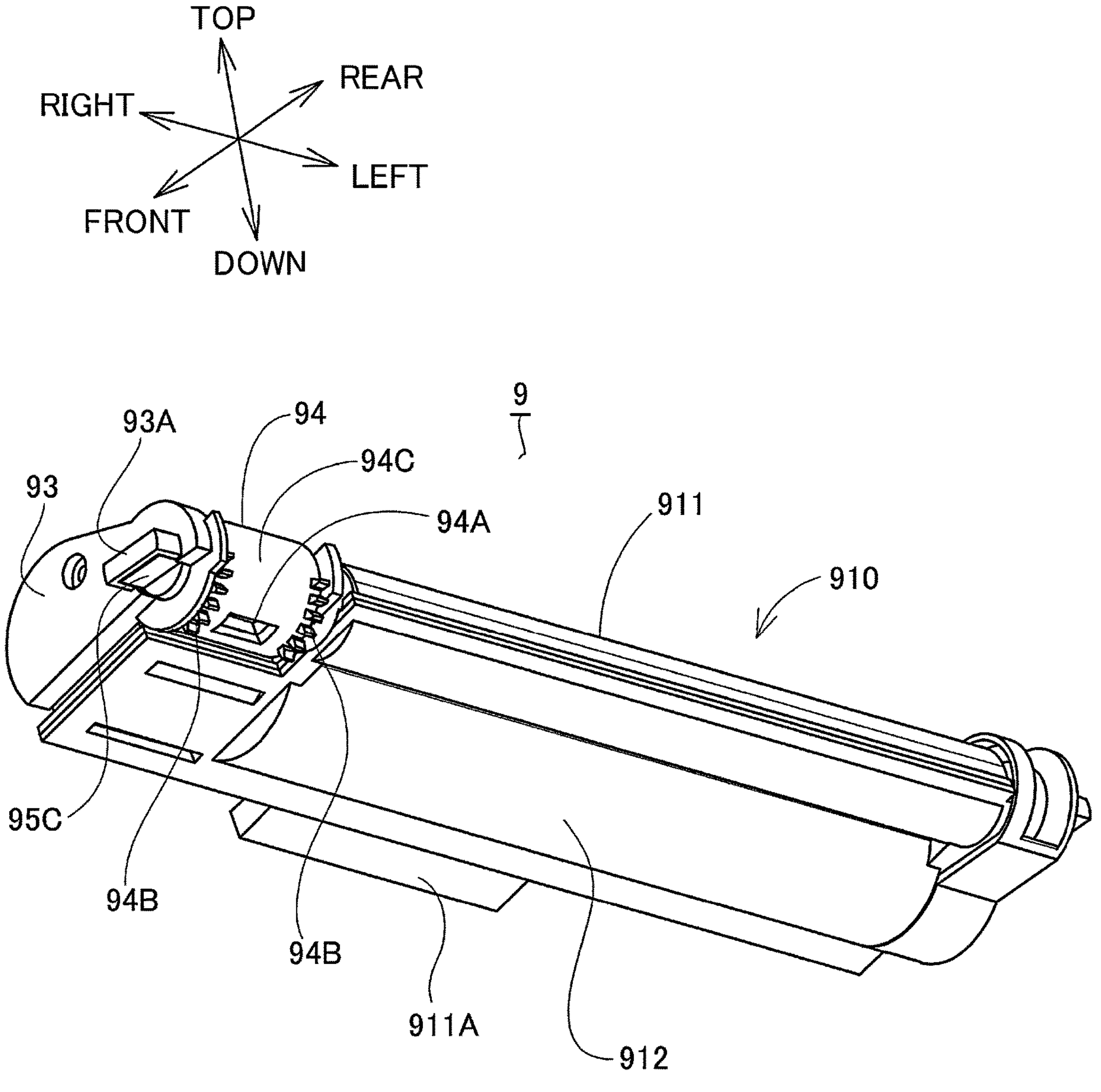
FIG. 13 is a perspective view of the toner cartridge viewed from a bottom.
Figure 14:
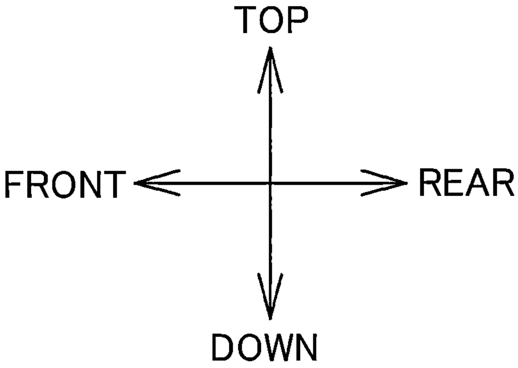
FIG. 14 is a sectional view showing the toner cartridge.
Figure 14:
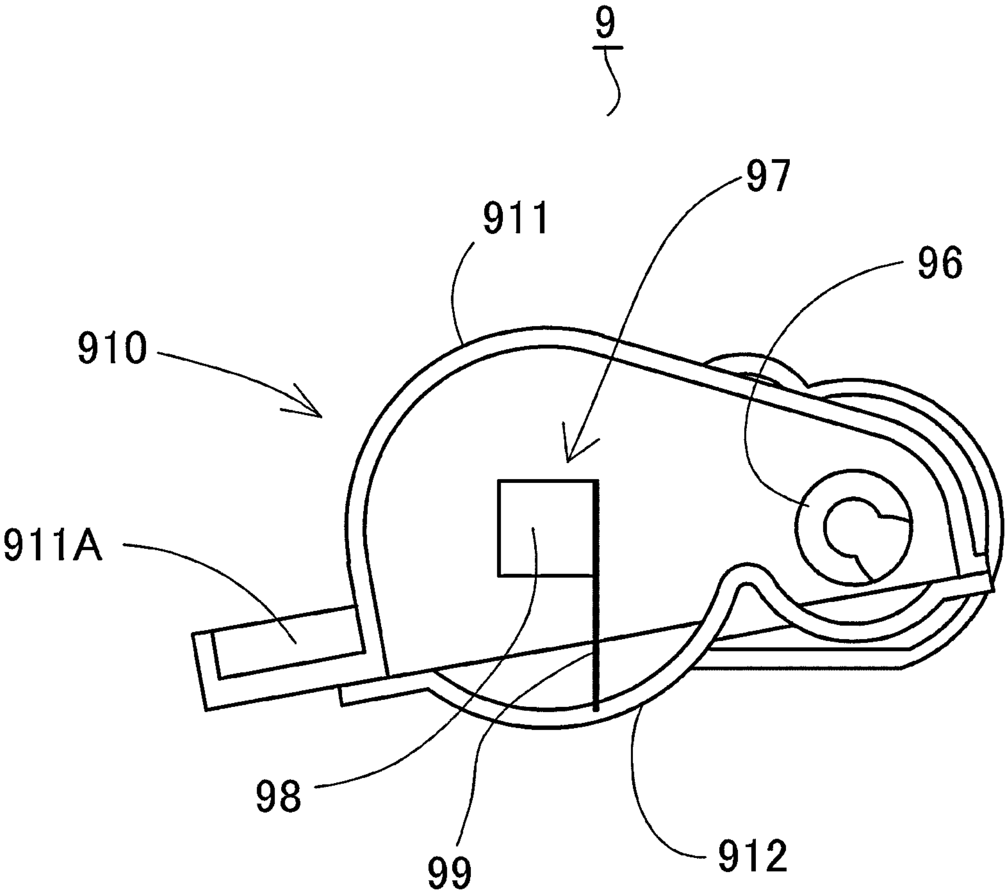
Figure 15:
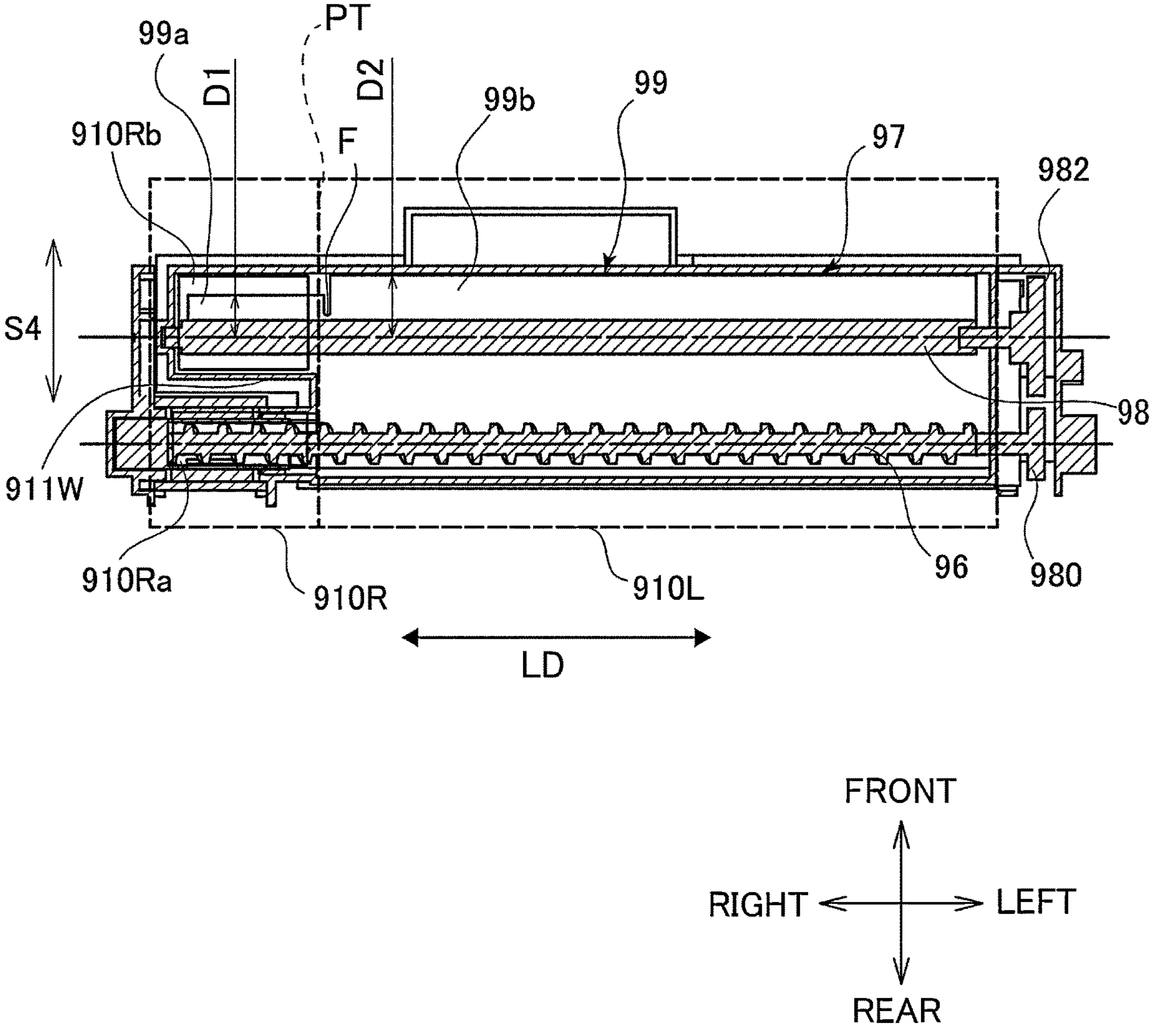
FIG. 15 is a sectional view of the toner cartridge viewed from a top to a bottom.
Figure 16:
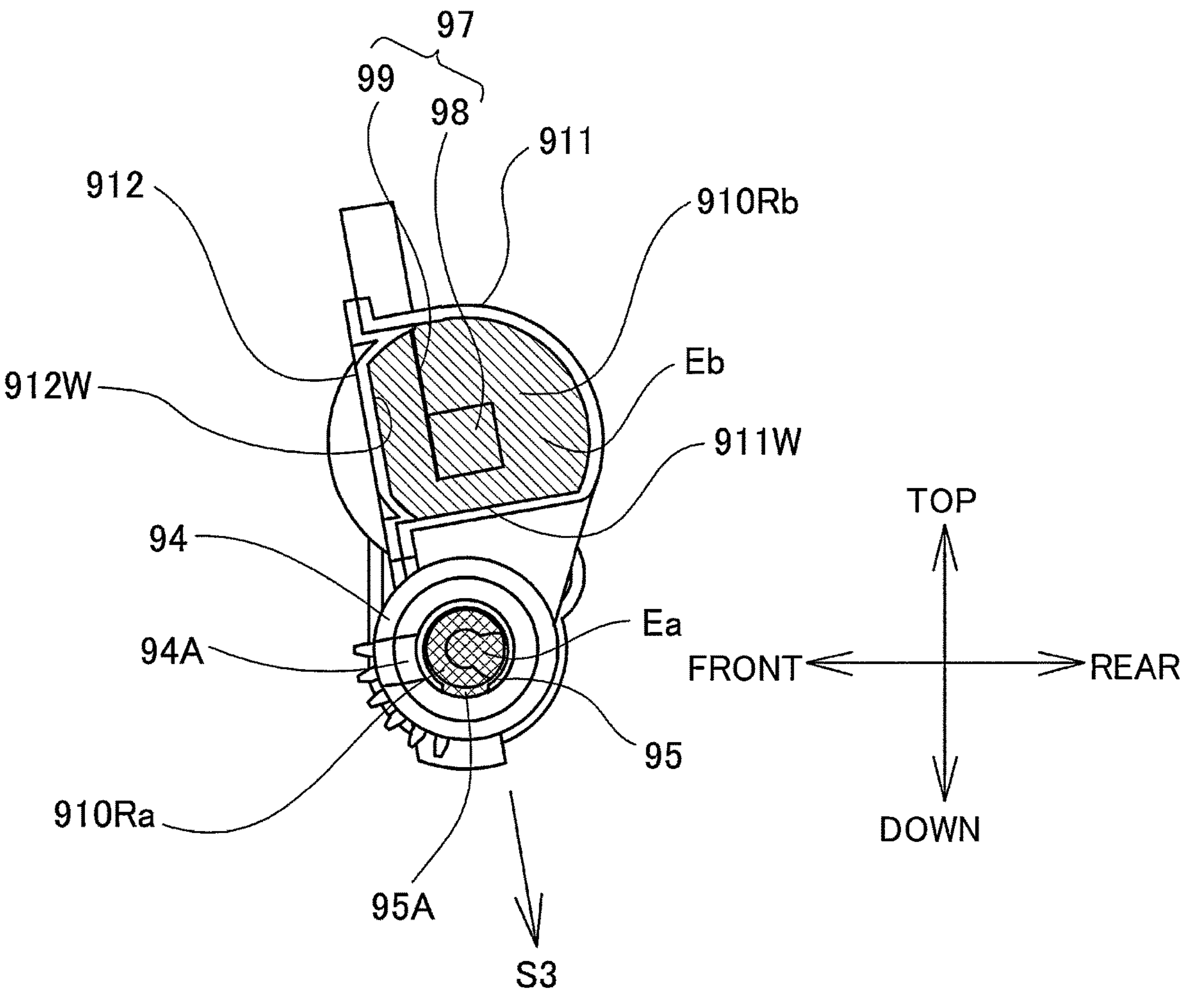
FIG. 16 is a sectional view of the toner cartridge viewed from right to left along a longitudinal direction.

Next, the configuration of the toner cartridge 9 will be described using FIG. 12 through FIG. 16. FIG. 12 is an exploded perspective view showing the toner cartridge 9. FIG. 13 is a perspective view of the toner cartridge 9 viewed from a bottom. FIG. 14 is a sectional view showing the toner cartridge 9. FIG. 15 is a sectional view of the toner cartridge 9 viewed from a top to a bottom. FIG. 16 is a sectional view of the toner cartridge 9 viewed from a right to a left along a longitudinal direction LD.

As shown in FIG. 12, the toner cartridge 9 includes a container member 911, a bottom member 912, a left side holder 92, a right side holder 93, an opening forming member 95, and a discharge side shutter 94. Further, the toner cartridge 9 includes a feeding screw 96 as a feeding portion, a second agitator (hereinafter referred to as a mixing member) 97, a feeding screw gear 980, an idle gear 981, and a second agitator gear 982.

As shown in FIG. 12 and FIG. 13, the container member 911 and the bottom member 912 form a toner container 910 as a frame, and the toner is accommodated in the toner container 910. At one end portion of the toner container 910 in the longitudinal direction LD, the discharge side shutter 94 is arranged. The discharge side shutter 94 as a second opening forming member includes a discharging port forming surface 94C on outer periphery portion, and an opening portion (hereinafter referred to as a second opening portion) 94A for discharging the toner to an outside is formed on the discharging port forming surface 94C. Incidentally, the discharge side shutter 94 is constituted of the container member 911 and the bottom member 912 as separate members, however, the discharge side shutter 94 may be integral with the container member 911. Furthermore, the discharge side shutter 94, the container member 911, and the bottom member 912 may be integral.

Further, as shown in FIG. 12 and FIG. 14, the feeding screw 96 and the mixing member 97 are rotatably provided inside the toner container 910. The feeding screw 96 and the mixing member 97 rotates when a driving force is transmitted to the feeding screw gear 980 and the second agitator gear 982, respectively, which are provided outside the toner container 910. The mixing member 97, similar to the first agitator 75A, includes a mixing rod 98 as a rotational shaft and a mixing sheet 99 as a sheet member. One end portion of the mixing sheet 99 is fixed to the mixing rod 98 and the other end portion is a free end portion.

The toner which is accommodated inside the toner container 910 is mixed and fed by the mixing member 97 toward the feeding screw 96, then fed by the feeding screw 96 toward the first opening portion 95A shown in FIG. 12, and discharged from the first opening portion 95A.

As shown in FIG. 12, the opening forming member 95 is arranged inside the discharge side shutter 94. The opening forming member 95 as a first opening forming member is provided at one end portion of the toner container 910 in the longitudinal direction LD and includes the first opening portion 95A as an opening portion and a closed portion 95B. The toner is possible to be discharged from the toner cartridge 9 in a case that the first opening portion 95A and the second opening portion 94A are opposing each other. On the other hand, in a case the first opening portion 95A opposes the discharging port forming surface 94C, the toner is restricted from being discharged from the toner cartridge 9 and the toner inside is prevented from leaking outside such as during transporting the toner cartridge 9.

An internal constitution of the toner cartridge 9 will be described more specifically by using FIG. 15 and FIG. 16. The toner cartridge 9 includes a first portion 910R and a second portion 910L which are arranged in a line in the longitudinal direction LD (right-left direction) as shown in FIG. 15. The first portion 910R is provided with a partition wall 911W which extends in the longitudinal direction LD (right-left direction), while the second portion 910L is not provided with the partition wall 911W. The second portion 910L is larger than the first portion 910R in volume.

Furthermore, the first portion 910R includes a first chamber 910Ra and a second chamber 910Rb which are aligned in parallel in a direction of an arrow S4 as a first direction which intersects with the longitudinal direction LD. The first opening portion 95A (see FIG. 12) is formed in the first chamber 910Ra. The mixing rod 98 and the mixing sheet 99 of the mixing member 97 extend over the second chamber 910Rb of the first portion 910R and the second portion 910L.

Further, the first chamber 910Ra is not directly connected to the second chamber 910Rb in the direction of the arrow S4. The first chamber 910Ra is connected to the second chamber 910Rb via the second portion 910L. That is, the toner in the second chamber 910Rb is fed from the second chamber 910Rb to the first chamber 910Ra through the second portion 910L, and then discharged to an outside of the toner cartridge 9 via the first opening portion 95A and the second opening portion 94A.

The toner which is accommodated in the second chamber 910Rb needs to be fed toward the second portion 910L by a rotation of the mixing member 97. In the embodiment, it is possible to feed the toner from the second chamber 910Rb to the second portion 910L by the mixing sheet 99 of the mixing member 97.

Details of the mixing member 97 will be described by using FIG. 15. The mixing sheet 99 includes a first sheet portion 99*a* and a second sheet portion 99*b* which are arranged side by side in the longitudinal direction LD. The first sheet portion 99*a* is arranged at a position which corresponds to the second chamber 910Rb and the second sheet portion 99*b* is arranged at a position which corresponds to the second portion 910L. A slit F as a first slit is provided between the first sheet portion 99*a* and the second sheet portion 99*b*. That is, the first sheet portion 99*a* and the second sheet portion 99*b* are separated by the slit F.

The slit F is arranged corresponding to a boundary portion PT between the second chamber 910Rb and the second portion 910L, and in more detail, the slit F is arranged slightly closer to the second portion 910L than the boundary portion PT. Thus, it is possible to reduce an interference of the second sheet portion 99*b* with the partition wall 911W while there are some mounting rattling of the mixing member 97.

The first sheet portion 99*a* and the second sheet portion 99*b* differ from each other in length in a radial direction which intersects (is perpendicular to) the longitudinal direction LD. A length of the first sheet portion 99*a* in the radial direction is a length D1, and a length of the second sheet portion 99*b* in the radial direction is a length D2 which is longer than the length D1 (D2≥D1). Incidentally, the length D1 and the length D2 may be a length from a center of an axis of the mixing rod 98 to an end portion of the first sheet portion 99*a* in the radial direction and a length from the center of the axis of the mixing rod 98 to an end portion of the second sheet portion 99*b* in the radial direction, respectively.

By defining the length D1 and the length D2 as described above, a peripheral velocity of a leading end portion of the second sheet portion 99*b* is faster than that of a leading end portion of the first sheet portion 99*a*. In this way, the toner in the second chamber 910Rb is mixed by the first sheet portion 99*a* and fed toward the second portion 910L. The toner in the second portion 910L is mixed and fed by the second sheet portion 99*b* toward the feeding screw 96.

As shown in FIG. 16, a sectional area Eb of a space which forms the second chamber 910Rb (hatching portion) is constituted to be greater than or equal to a sectional area Ea of a space which forms the first chamber 910Ra (hatching portion) (Eb≥Ea). The toner is fed into the first chamber 910Ra from the second portion 910L by the feeding screw 96, and the first chamber 910Ra is formed along an outer peripheral surface of the feeding screw 96. In this way, it is possible to discharge a desired amount of the toner from the first opening portion 95A by a rotation of the feeding screw 96. Further, since the sectional area Ea of the first chamber 910Ra is set to be smaller than or equal to the sectional area Eb of the second chamber 910Rb, it is possible to downside a radial size of the feeding screw 96 and reduce a torque which is required to drive the feeding screw 96.

Further, since the first portion 910R is separated by the partition wall 911W, it is possible to use effectively the second chamber 910Rb which is a remaining portion of the first portion 910R other than the first chamber 910Ra as a toner accommodating space. In this way, it is possible to increase a toner accommodating capacity of the toner cartridge 9.

Further, as will be described in detail later, FIG. 16 shows a posture of the toner cartridge 9 when it is being mounted on the developing unit 7, and the toner cartridge 9 performs an insertion movement which moves toward a direction of an arrow S3 as a mounting direction which intersects the longitudinal direction LD. During the insertion operation, the first chamber 910Ra is positioned at a lower position than the second chamber 910Rb, and the first opening portion 95A which is included in the first chamber 910Ra is positioned at a lower position in a direction of gravity. Further, during the insertion operation as a first operation, the toner cartridge 9 is in a posture in which the longitudinal direction LD is horizontal.

Between the first chamber 910Ra and the second chamber 910Rb, the partition wall 911W extends along a plane which intersects the direction of the arrow S3 and the direction of the arrow S4 (see FIG. 15). Since there is the partition wall 911W, the toner in the second chamber 910Rb does not flow into the first chamber 910Ra in the direction of the arrow S3 when the toner cartridge 9 is mounted on the developing unit 7.

In this way, it prevents the excessive toner flowing into the first chamber 910Ra immediately after the toner cartridge 9 is mounted on the developing unit 7. And it reduces a risk of the excess toner being discharged into the developing unit 7 from the toner cartridge 9 and a risk of toner leakage when the toner is discharged from the toner cartridge 9 to the developing unit 7.

A flat portion 912W which is formed by the bottom member 912 is arranged in the second chamber 910Rb. The flat portion 912W is a surface which intersects the partition wall 911W and extends substantially parallel to the direction of the arrow S3. In other words, the flat portion 912W extends along the direction of the arrow S4 (see FIG. 15). The flat portion 912W allows the toner in the second chamber 910Rb to slide down the flat portion 912W when the toner cartridge 9 is being mounted on the developing unit 7 in the direction of the arrow S3. And the toner is loosened and becomes easier to be fed by colliding with the partition wall 911W, and is smoothly fed from the second chamber 910Rb toward the second portion 910L.

[Support of Toner Cartridge]

Next, a support constitution of the toner cartridge 9 will be described by using part (a) to part (c) of FIG. 17 and FIG. 18. Part (a) of FIG. 17 is a perspective view showing the process cartridge 5 and the toner cartridge 9 before it is mounted on the process cartridge 5. Part (b) of FIG. 17 is a perspective view showing the toner cartridge 9 in a process of being mounted on the process cartridge 5. Part (c) of FIG. 17 is a perspective view showing the toner cartridge 9 which has been mounted on the process cartridge 5. FIG. 18 is a sectional view of the toner cartridge 9 which has been mounted on the process cartridge 5, when it is viewed from right to left along the longitudinal direction.

As shown in parts (a) to (c) of FIG. 17, the toner cartridge 9 is constituted to be dismountable from the developing unit 7 of the process cartridge 5. The container member 911 of the toner cartridge 9 is provided with a handle portion 911A as a holding portion, and the left side holder 92 and the right side holder 93 are fixed to both end portions of the toner container 910 in the longitudinal direction LD. The left side holder 92 and the right side holder 93 are provided with a supported protrusion 92A and a supported protrusion 93A, respectively, for being supported by the developing unit 7. Further, the developing unit 7 is provided with a supporting portion 730 and a supporting portion 731 for supporting the supported protrusion 92A and the supported protrusion 93A.

In more detail, the supporting member 730 and the supporting member 731 are provided on the side holder 719 and the toner receiving cover 774 of the developing unit 7. The side holder 719 and the toner receiving cover 774 constitute a mounting portion 780 in which it is possible to mount the toner cartridge 9.

When mounting the toner cartridge 9 on the developing unit 7, a user performs a rotation operation after an insertion operation to the toner cartridge 9. That is, as shown in part (a) of FIG. 17, the user holds the handle portion 911A and moves the toner cartridge 9 in the direction of the arrow S3 from above to the developing unit 7. The user aligns the supported protrusion 92A and the supported protrusion 93A of the toner cartridge 9 with the supporting portion 730 and the supporting portion 731 of the developing unit 7, and inserts the supported protrusion 92A and the supported protrusion 93A into the supporting portion 730 and the supporting portion 731 as shown in part (b) of FIG. 17. In this way, the insertion operation is completed and the toner cartridge 9 is supported by the supporting portion 730 and the supporting portion 731.

Next, the user performs the rotation operation as a second operation which rotates the toner cartridge 9 around the supported protrusion 92A and the supported protrusion 93A as a center of rotation whose axis is the same as a center of rotation CTI of the feeding screw 96. In this way, the toner cartridge 9 is completed to be mounted on the process cartridge 5 as shown in part (c) of FIG. 17, and the toner cartridge 9 and the process cartridge 5 become the cartridge unit 10.

Incidentally, while the toner cartridge 9 is completed to be mounted on the process cartridge 5, the feeding screw gear 980 (see FIG. 12) of the toner cartridge 9 is possible to mesh with the idle gear 715B (see FIG. 5) of the developing unit 7. In this way, a driving force of the developing unit 7 is transmitted to the toner cartridge 9.

A state in which the toner cartridge 9 is completed to be mounted will be described by using FIG. 18. In the rotation operation of the toner cartridge 9 while it is being mounted as described above, the second chamber 910Rb moves in a direction approaching to the developing unit 7. And a straight line LN1, which connects the center of rotation CT1 of the feeding screw 96 of the toner cartridge 9 with a center of rotation CT2 of the mixing rod 98, extends along a horizontal direction viewed in the longitudinal direction LD. In this way, a toner feeding passage from the second chamber 910Rb to the first chamber 910Ra through the second portion 910L is arranged so that there is less difference in height, and it is possible to reduce damage to the toner which is being fed.

Further the toner receiving cover 774 of the toner receiving portion 770, as will be described below, is arranged around the toner receiving port 771 of the developing unit 7, which is exposed while the toner cartridge 9 is being mounted or removed, and extends at a higher position than the toner receiving port 771. The toner receiving cover 774 includes a step 774B and the step 774B is provided so as to project upward between the first chamber 910Ra and the second chamber 910Rb of the toner cartridge 9. In this way, it is possible to prevent the toner from leaking out of the toner receiving port 771 while the toner cartridge 9 is being mounted or dismounted.

An end of lifetime of the toner cartridge 9, which is determined from an amount of the toner accommodated in the toner cartridge 9, is set to be shorter than an end of lifetime of the process cartridge 5 which is determined from an end of lifetime of the photosensitive drum 61 and an end of lifetime of the developing roller 71. Thus, it is economical to replace only the toner cartridge 9 which reaches an end of lifetime, separately from the process cartridge 5. In the embodiment, it is possible to replace the toner cartridge 9 simply by opening the door 21 (see FIG. 1), so a user is able to perform a replacement operation of the toner cartridge 9 without removing the process cartridge 5 from the main assembly 2. That is, the toner cartridge 9 is possible to be mounted on and dismounted from the developing unit 7, while the process cartridge 5 which includes the developing unit 7 is mounted on the main assembly 2 of the image forming apparatus 1.

[Opening and Closing Operation of Receiving Side Shutter]

Next, an opening and closing operation of the receiving side shutter 773 will be described by using FIG. 5 and FIG. 19. Part (a) of FIG. 19 is a sectional view showing the receiving side shutter 773 of the developing unit 7 in a closed state, and part (b) of FIG. 19 is a sectional view showing the receiving side shutter 773 in an open state. That is, the receiving side shutter 773 as a shutter is able to move between the opened position which opens the toner receiving port 771 and the closed position which shields the toner receiving port 771.

As shown in FIG. 5, the toner receiving portion 770 of the developing unit 7 is constituted of the toner receiving port 771 which is provided on a top surface of the casing 700, a receiving side shutter seal 772, the receiving side shutter 773, the toner receiving cover 774, and a connecting seal 775. The receiving side shutter seal 772, the receiving side shutter 773, the toner receiving cover 774, and the connecting seal 775 are provided with a hole portion 772A, a hole portion 773A, a hole portion 774A, and a hole portion 775A, respectively. The hole portion 772A, the hole portion 774A, and the hole portion 775A of the receiving side shutter seal 772, the toner receiving cover 774, and the connecting seal 775 are assembled in positions which corresponds to the toner receiving port 771.

Further, the receiving side shutter 773 is provided with a shielding portion 773B in addition to the hole portion 773A, and is assembled to the casing 700 of the developing unit 7 in a state that a slide movement is possible. The toner receiving port 771 is opened and closed by the slide movement of the receiving side shutter 773 along the front-back direction.

The opening and closing operation of the receiving side shutter 773 is performed in conjunction with the mounting and dismounting operation of the toner cartridge 9. Here, as shown in FIG. 12 and part (a) and part (b) of FIG. 19, a pair of driving protrusion groups 94B are arranged on an outer peripheral surface of the discharge side shutter 94 of the toner cartridge 9. Further, a pair of driven protrusion groups 773C, which is able to engage the pair of driving protrusion groups 94B, is arranged in the receiving side shutter 773.

As described above, during the mounting process on the developing unit 7, the toner cartridge 9 is made a transition to a state of mounting completion by performing the rotation operation. As shown in part (a) of FIG. 19, in a state that the insertion operation of the toner cartridge 9 is completed and before the rotation operation, the shielding portion 773B of the receiving side shutter 773 is opposed to the toner receiving port 771, and the toner receiving port 771 is closed. At this time, the driving protrusion group 94B and the driven protrusion group 773C are engaged.

Then, as shown in part (b) of FIG. 19, when the rotation operation of the toner cartridge 9 is performed, the receiving side shutter 773 slides to move in conjunction with the rotation operation of the toner cartridge 9 since the driving protrusion group 94B and the driven protrusion group 773C are engaged. In this way, the hole portion 773A of the receiving side shutter 773 is opposed to the toner receiving port 771, and the toner receiving port 771 is opened.

Similarly, when the toner cartridge 9 is dismounted from the developing unit 7, the receiving side shutter 773 slides to move in conjunction with the rotation operation of the toner cartridge 9, and the toner receiving port 771 is closed.

As described above, in a state that the toner cartridge 9 is mounted on the developing unit 7, the toner receiving port 771 is opened and it is possible to receive the toner into an inside of the developing unit 7. On the other hand, in a state that the toner cartridge 9 is not mounted on the developing unit 7, the toner receiving port 771 is closed and it is possible to prevent foreign matter from entering the inside of the developing unit 7 and the toner from leaking outside. Further, since the toner receiving port 771 transitions between the closed state and the opened state in conjunction with the rotation operation of the toner cartridge 9, it is possible to improve operability since no operation is needed just to open the toner receiving port 771.

[Opening and Closing Operation of Discharge Side Shutter]

Next, an opening and closing operation of the discharge side shutter 94 will be described by using part (a) and part (b) of FIG. 20. Part (a) of FIG. 20 is a side view showing a state that the discharge side shutter 94 is closed, and part (b) of FIG. 20 is a side view showing a state that the discharge side shutter 94 is opened. That is, the discharge side shutter 94 is able to move to the closed position where the discharge port forming surface 94C as a shielding portion shields the first opening portion 95A, and the opened position where the second opening portion 94A opens the first opening portion 95A by opposing the first opening portion 95A.

As described above, when the first opening portion 95A of the opening forming member 95 and the second opening portion 94A of the discharge side shutter 94 as shown in FIG. 12 are opposing each other, it is possible to discharge the toner from the toner cartridge 9 to outside. Further, when the discharge port forming surface 94C of the outer peripheral portion of the discharge side shutter 94 is opposed to the first opening portion 94A, the discharge of the toner from the toner cartridge 9 to the outside is prevented. Similar to the opening and closing operation of the receiving side shutter 773 described above, the opening and closing operation of the discharge side shutter 94 is also performed in conjunction with the rotation operation of the toner cartridge 9 when it is mounted or dismounted.

As shown in FIG. 12, FIG. 13 and part (a) of FIG. 20, a locked protrusion 95C is provided at an end portion of the opening forming member 95 in the longitudinal direction LD, and the locked protrusion 95C is covered by a supported protrusion 93A of the right side holder 93. Further, a supporting portion 731 of the developing unit 7 is provided with a pair of locking portions 731A as a first guiding portion and a cutout portion 731B as a second guiding portion. The pair of locking portions 731A guides the supported protrusion 93A as a guide portion of the toner cartridge 9 in the direction of the arrow S3 (mounting direction) during an insertion operation of the toner cartridge 9. Incidentally, since a constitution of the supporting portion 730 is similar to that of the supporting portion 731, a description of the support portion 730 is omitted.

As shown in part (a) of FIG. 20, in a state after the insertion operation of the toner cartridge 9 is completed and before the rotation operation, the closed portion 95B (see FIG. 12) of the opening forming member 95 and the second opening portion 94A (see FIG. 12) are opposing each other. Thus, the first opening portion 95A (see FIG. 12) is closed. At this time, the locked protrusion 95C of the opening forming member 95 is inserted between the pair of locking portions 731A, and the opening forming member 95 is in a state that the rotation operation is prevented with respect to the developing unit 7.

Then, as shown in part (b) of FIG. 20, when the rotation operation of the toner cartridge 9 is performed, the supported protrusion 93A of the toner cartridge 9 is guided in a rotational direction around the center of rotation CT1 of the feeding screw 96 (see FIG. 18) by the cutout portion 731B. As described above, since the opening forming member 95 is prevented from rotating by the pair of locking portions 731A, members of the toner cartridge 9 other than the opening forming member 95 rotates. Incidentally, since the supported protrusion 93A of the right side holder 93 is able to enter the cutout portion 731B, rotations of any members of the toner cartridge 9 other than the opening forming member 95 are not prevented.

In this way, when the rotation operation of the toner cartridge 9 is performed, the opening forming member 95 does not rotate, so the discharge side shutter 94 rotates relative to the opening forming member 95. Then, the second opening portion 94A of the discharge side shutter 94 is opposed to the first opening portion 95A, and the first opening portion 95A (see FIG. 12) is opened.

Similarly, when the toner cartridge 9 is dismounted from the developing unit 7, the discharge side shutter 94 rotates in conjunction with the rotation operation of the toner cartridge 9, and the first opening portion 95A (see FIG. 12) is closed.

[Toner Cartridge Lift Mechanism]

Next, the lift mechanism 760 of the toner cartridge 9 will be described by using from part (a) of FIG. 21 through part (c) of FIG. 22. Part (a) of FIG. 21 is a perspective view showing a state that the toner cartridge 9 is on the lift mechanism 760 during the mounting process. Part (b) of FIG. 21 is a perspective view showing a state that the toner cartridge 9 is opening the lift mechanism 760 during the mounting process. Part (c) of FIG. 21 is a perspective view showing a state that mounting of the toner cartridge 9 is completed. Part (a) of FIG. 22 is a perspective view showing a state that mounting of the toner cartridge 9 is completed. Part (b) of FIG. 22 is a perspective view showing a state that the lift mechanism 760 is lifting up the toner cartridge 9. Part (c) of FIG. 22 is a perspective view showing a state that the toner cartridge 9 is lifted up. Incidentally, in part (a) to part (c) of FIG. 22, the side holder 719 of the developing unit 7 is omitted for description.

As shown in part (a) to part (c) of FIG. 22, the left side holder 92 of the toner cartridge 9 is provided with a protruding portion 92B, and the protruding portion 92B includes an urging surface 92C, a holding surface 92D, and a receiving surface 92E. Further, as shown in FIG. 8, the lift mechanism 760 is constituted of a boss 719A, a lift member 761, and a torsion coil spring 762 which are provided with the side holder 719 of the developing unit 7. The lift member 761 and the torsion coil spring 762 are attached to the boss 719A, and the lift member 761 is rotatable around the boss 719A. The lift member 761 includes an urging portion 761A, a handling portion 761B, and a lifting portion 761C. Further, the lift member 761 is urged by the torsion coil spring 762 in a direction of an arrow R1.

First, a movement of the lift mechanism 760 during the mounting process of the toner cartridge 9 will be described by using part (a) to part (c) of FIG. 21. When the rotation operation of the toner cartridge 9 is performed for mounting the toner cartridge 9, as shown in part (a) of FIG. 21, the urging surface 92C of the protruding portion 92B is urged with the urging portion 761A of the lift member 761, and the toner cartridge 9 is on the lift mechanism 760.

When the rotation operation of the toner cartridge 9 is continued further, as shown in part (b) of FIG. 21, the lift member 761 is urged by the urging surface 92C of the protruding portion 92B and rotates in a direction of an arrow R2 against an urging force of the torsion coil spring 762. In this way, the lift member 761 allows the rotation operation of the toner cartridge 9.

And when the rotation operation of the toner cartridge 9 is further continued and mounting of the toner cartridge 9 is completed, the protruding portion 92B enters below the lift member 761 as shown in part (c) of FIG. 21. Then, the lift member 761 rotates in the direction of the arrow R1 by the urging force of the torsion coil spring 762, and the urging portion 761A of the lift member 761 contacts with the holding surface 92D. In this way, it is possible to maintain a state that mounting of the toner cartridge 9 is completed, by the lift member 761.

Next, a movement of the toner cartridge 9, which makes transitions from the mounting complete state to the lifted up state, will be described by using part (a) to part (c) of FIGS. 22. As shown in part (a) of FIG. 22, in the state that mounting of the toner cartridge 9 is completed, the urging portion 761A of the lift member 761 is urged with the holding surface 92D, and the toner cartridge 9 is not possible to be dismounted from the developing unit 7.

To dismount the toner cartridge 9 from the developing unit 7, as shown in part (b) of FIG. 22, a user handles the handling portion 761B of the lift member 761 and rotates the lift member 761 in the direction of the arrow R2. In this way, the lifting portion 761C of the lift member 761 presses the receiving surface 92E of the protruding portion 92B and is able to rotate the toner cartridge 9 upward. At this time, the urging portion 761A of the lift member 761 is spaced from a movement locus of the protruding portion 92B and does not prevent the toner cartridge 9 from rotating.

After that, when the user releases a hand from the handling portion 761B, the lift member 761 rotates in the direction of the arrow R1 by the urging force of the torsion coil spring 762, as shown in part (c) of FIG. 22. Then, the urging surface 92C of the protruding portion 92B is urged with the urging portion 761A of the lift member 761, and the toner cartridge 9 is on the lift mechanism 760 in a lifted up state. In the lifted up state, the toner cartridge 9 is possible to be dismounted from the developing unit 7 since its upward movement is not prevented by the lift member 761.

Summary of the First Embodiment

Recently, it is desired to increase a toner accommodating capacity within a constraint of a limited outer size for a toner cartridge which is able to be mounted on and dismounted from the process cartridge 5. So, in the embodiment, the toner container 910 of the toner cartridge 9 is divided into the first portion 910R and the second portion 910L which are aligned in the longitudinal direction LD, and the first portion 910R is divided into the first chamber 910Ra and the second chamber 910Rb by the partition wall 911W. The first chamber 910Ra and the second chamber 910Rb are aligned in the direction of the arrow S4, which intersects the longitudinal direction LD.

The second portion 910L is directly connected to the first chamber 910Ra and the second chamber 910Rb in the longitudinal direction LD, while the first chamber 910Ra and the second chamber 910Rb are not directly connected in the direction of the arrow S4 by being divided by the partition wall 911W. The first chamber 910Ra is provided with the first opening portion 95A which discharges the toner to the toner receiving port 771 of the developing unit 7, and the toner in the toner container 910 is fed toward the first opening portion 95A by the mixing member 97 and the feeding screw 96.

Since the sectional area Ea of the first chamber 910Ra is set to be smaller than or equal to the sectional area Eb of the second chamber 910Rb, it is possible to downside the radial size of the feeding screw 96 and reduce the torque which is required to drive the feeding screw 96.

Further, since the first portion 910R is separated by the partition wall 911W, it is possible to use effectively the second chamber 910Rb which is the remaining portion of the first portion 910R other than the first chamber 910Ra as the toner accommodating space. In this way, it is possible to increase the toner accommodating capacity of the toner cartridge 9. The sectional area Eb of the second chamber 910Rb is greater than or equal to the sectional area Ea of the first chamber 910Ra, when viewed in the longitudinal direction LD.

When the toner cartridge 9 is being mounted on the developing unit 7, a user aligns the supported protrusion 92A and the supported protrusion 93A of the toner cartridge 9 with the supporting portion 730 and the supporting portion 731 of the developing unit 7, and inserts the supported protrusion 92A and the supported protrusion 93A into the supporting portion 730 and the supporting portion 731. In this way, the insertion operation is completed, and the toner cartridge 9 is supported by the supporting portion 730 and the supporting portion 731.

Next, the user performs the rotation operation to rotate the toner cartridge 9 around the supported protrusion 92A and the supported protrusion 93A which are coaxial with the feeding screw 96 as a center of rotation. As a result, mounting the toner cartridge 9 on the process cartridge 5 is completed as shown in part (c) of FIG. 17, and the toner cartridge 9 and the process cartridge 5 become the cartridge unit 10.

During the rotation operation of the toner cartridge 9, the receiving side shutter 773 and the discharge side shutter 94 move from the closed position to the opened position. As a result, the first opening portion 95A of the toner cartridge 9 and the toner receiving port 771 of the developing unit 7 are opened, and it is possible to supply the toner from the toner cartridge 9 to the developing unit 7. Thus, it is possible to reduce toner contamination at a connection portion between the toner cartridge 9 and the developing unit 7 during mounting and dismounting of the toner cartridge 9, and it is also possible to improve operability since no operation is needed just to open the receiving side shutter 773 and the discharge side shutter 94.

Second Embodiment

Next, the second embodiment of the present invention will be described, and a constitution of the second embodiment is a constitution in which the first sheet portion 99*a* of the mixing member 97 in the first embodiment is changed. Therefore, for constitutions which are the same as in the first embodiment, figures are omitted or the same reference numerals are attached, and the constitutions are described.

The mixing member 297 according to the second embodiment includes the mixing rod 98 and the mixing sheet 299 as a sheet member, as shown in FIG. 23. The mixing sheet 299 includes a first sheet portion 299*a* and the second sheet portion 99*b* which are arranged side by side in the longitudinal direction LD. The first sheet portion 299*a* is arranged at a position corresponding to the second chamber 910Rb and the second sheet portion 99*b* is arranged at a position which corresponds to the second portion 910L. The slit F is provided between the first sheet portion 299*a* and the second sheet portion 99*b*.

The first sheet portion 299*a* and the second sheet portion 99*b* differ from each other in length in the radial direction which intersects (perpendicular to) the longitudinal direction. A length of the first sheet portion 299*a* in the radial direction is the length D1 (see FIG. 15) which is the same as the first embodiment, and the length of the second sheet portion 99*b* in the radial direction is the length D2 (see FIG. 15) which is longer than or equal to the length D1 (D2≥D1). Incidentally, the length D1 and the length D2 may be a length from the center of the axis of the mixing rod 98 to an end portion of the first sheet portion 299*a* in the radial direction and a length from the center of the axis of the mixing rod 98 to the end portion of the second sheet portion 99*b* in the radial direction, respectively.

The first sheet portion 299*a* includes a plurality (four in the embodiment) of slits 99 ml. Each of the slits 99 ml as a second slit extends in a direction which is inclined to an axial direction of the mixing rod 98 (longitudinal direction LD) and the radial direction which is perpendicular to the axial direction (for example, direction of arrow S4), so as to have m degree angle to the axial direction of the mixing rod 98. More specifically, the slit 99 ml extends in such a direction that approaches the second portion 910L as it approaches an inside in the radial direction. In the embodiment, the four slits 99 ml are provided at intervals, however, one to three or five or more slits may be provided.

As the mixing member 297 rotates, the toner, which is accommodated in the second chamber 910Rb, is mixed by the first sheet portion 299*a*. Further, the toner which is accommodated in the second chamber 910Rb is fed toward the second portion 910L since the plurality of slits 99 ml are formed in the first sheet portion 299*a*.

Summary of the Second Embodiment

In the embodiment, since the plurality of slits 99 ml are provided with the first sheet portion 299*a*, it is possible to feed the toner in the second chamber 910Rb more efficiently toward the second portion 910L.

Third Embodiment

Next, the third embodiment of the present invention will be described, and a constitution of the third embodiment is a constitution in which the mixing member 97 in the first embodiment is changed. Therefore, for constitutions which are the same as in the first embodiment, figures are omitted or the same reference numerals are attached, and the constitutions are described.

The mixing member 397 according to the third embodiment includes a mixing rod 398 as a rotational shaft and a mixing sheet 399 as a sheet member, as shown in FIG. 24. The mixing sheet 399 is not arranged in a position which corresponds to the second chamber 910Rb, but in a position which corresponds to the second portion 910L.

The mixing rod 398 includes a first shaft portion 398*a* which is provided in a position which corresponds to the first chamber 910Ra and a second shaft portion 398*b* which is provided in a position which corresponds to the second portion 910L, and the second shaft portion 398*b* is formed as a round rod. A screw 98S is provided on an outer periphery portion of the first shaft portion 398*a*, and the toner which is accommodated in the second chamber 910Rb is fed toward the second portion 910L when the screw 98S rotates.

Summary of the Third Embodiment

In the embodiment, since the screw 98S is provided on the outer periphery portion of the first shaft portion 398*a* of the mixing rod 398, it is possible to feed the toner in the second chamber 910Rb more reliably toward the second portion 910L.

Other Embodiments

Incidentally, in any embodiments described above, the developing roller 71 is in contact with the photosensitive drum 61, however, it may be constituted so that the developing roller 71 is not in contact with the photosensitive drum 61. That is, a constitution, in which the developing roller 71 is arranged opposing the photosensitive drum 61 with a small gap and the toner is developed on the photosensitive drum 61 through the small gap, may be applied.

Further, in any embodiments described above, the toner is fed to the first chamber 910Ra by the feeding screw 96, however, the present invention is not limited to this. For example, a belt conveyor or other toner feeding member may be applied instead of the feeding screw 96.

Further, in any embodiments described above, the sectional area Eb of the second chamber 910Rb is set to be greater than or equal to the sectional area Ea of the first chamber 910Ra, however, the present invention is not limited to this. For example, the sectional area Eb may be smaller than the sectional area Ea. Further, the partition wall 911W may be provided as an integral body with the toner container 910 or provided as a separate body.

Further, in the first embodiment and the second embodiment, the slit F is provided between the first sheet portion and the second sheet portion, however, the slit F may not be provided.

Further, in any embodiments described above, it is constituted that the opening forming member 95 does not rotate and the discharge side shutter 94 rotates according to the rotation operation of the toner cartridge 9, however, the present invention is not limited to this. For example, it may be constituted that the discharge side shutter 94 does not rotate and the opening forming member 95 rotates according to the rotation operation of the toner cartridge 9

According to the present invention, it is possible to increase the toner accommodating capacity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-080963 filed on May 12, 2021, which is hereby incorporated by reference herein in its entirety.

What is claimed is:

1. A developer accommodating device detachably mounted on a developing unit, the developer accommodating device comprising:

a frame extending in a longitudinal direction, and configured to accommodate toner and discharge the toner through an opening portion;

a guide portion configured to be guided by the developing unit while the developer accommodating device is being mounted on the developing unit in a mounting direction crossing the longitudinal direction;

a first portion including a first chamber, in which the opening portion is provided, and a second chamber which is aligned in a first direction perpendicular to the longitudinal direction, wherein the first chamber is spaced apart from the second chamber in the first direction, and the first chamber of the first portion communicates with the second chamber of the first portion only through a second portion.

2. A developer accommodating device according to claim 1, wherein at a position where the first chamber and the second chamber overlap in the longitudinal direction, a cross sectional area of the second chamber is equal to or larger than that of the first chamber as seen in the longitudinal direction.

3. A developer accommodating device according to claim 1, further comprising:

an agitating member rotatably supported by the frame and configured to agitate the developer accommodated in the frame, and a conveying portion rotatably supported by the frame and configured to convey the developer in the frame toward the opening portion.

4. A developer accommodating device according to claim 3, wherein the agitating member includes a rotational shaft and a sheet member fixed to the rotational shaft, the rotational shaft extending across both the second chamber of the first portion and the second portion in a shaft direction of the rotational shaft.

5. A developer accommodating device according to claim 4, wherein the sheet member includes a first sheet portion disposed in the second chamber of the first portion and a second sheet portion disposed in the second portion, a length of the first sheet portion being shorter than a length of the second sheet portion with respect to a radial direction perpendicular to the shaft direction.

6. A developer accommodating device according to claim 4, wherein the rotational shaft includes a screw disposed in the second chamber of the first portion and configured to convey the developer of the second chamber toward the second portion by a rotation of the rotational shaft.

7. A developer accommodating device according to claim 3, wherein the opening portion is a first opening portion, and the developer accommodating device further comprises:

a shutter including a shielding portion and a second opening portion, the shutter being movable between a closing position where the shielding portion shields the first opening portion and an opening position where the second opening portion opposes the first opening portion to open the first opening portion, wherein, in a posture where the longitudinal direction is a horizontal direction and the first opening portion is positioned downward in a gravity direction, the shutter moves from the closing position to the opening position by successively performing a first operation in which the developer accommodating device is mounted on the developing unit in the mounting direction and a second operation in which the developing unit rotates about a rotational center of the conveying portion.

8. A developer accommodating device according to claim 7, wherein in a state in which the second operation is completed, a straight line connecting the rotational center of the conveying portion and a rotational center of the agitating member extends along the horizontal direction as seen in a longitudinal direction.

9. A developer accommodating device according to claim 7, wherein in a state in which the developing unit is mounted on a main assembly of an image forming apparatus, the developer accommodating device is mountable to and dismountable from the developing unit.

10. A developer accommodating device according to claim 3, wherein the developing unit includes:

a housing extending in the longitudinal direction and configured to accommodate the developer and including a receiving opening configured to receive the developer from the developer accommodating device, a developer shutter movable between an opening position where the developer shutter opens the receiving opening and a closing position where the developer shutter closes the receiving opening, and a mounting portion on which the developer accommodating device is mounted.

11. A developer accommodating device detachably mounted on a developing unit, the developer accommodating device comprising:

a frame extending in a longitudinal direction, and configured to accommodate toner and discharge the toner through an opening portion;

a guide portion configured to be guided by the developing unit while the developer accommodating device is being mounted on the developing unit in a mounting direction crossing the longitudinal direction;

a first portion including a first chamber in which the opening portion is provided, a second chamber aligned with the first chamber in a first direction perpendicular to the longitudinal direction, and a partition wall partitioning the first chamber and the second chamber, the first chamber communicating with the second chamber only through a second portion.

12. A developer accommodating device according to claim 11, wherein at a position where the first chamber and the second chamber overlap in the longitudinal direction, a cross sectional area of the second chamber is equal to or larger than that of the first chamber as seen in the longitudinal direction.

13. A developer accommodating device according to claim 11, further comprising:

an agitating member rotatably supported by the frame and configured to agitate the developer accommodated in the frame; and a conveying portion rotatably supported by the frame and configured to convey the developer in the frame toward the opening portion.

14. A developer accommodating device according to claim 13, wherein the agitating member includes a rotational shaft and a sheet member fixed to the rotational shaft, the rotational shaft extending across both the second chamber of the first portion and the second portion in a shaft direction of the rotational shaft.

15. A developer accommodating device according to claim 14, wherein the sheet member includes a first sheet portion disposed in the second chamber of the first portion and a second sheet portion disposed in the second portion, a length of the first sheet portion being shorter than a length of the second sheet portion with respect to a radial direction perpendicular to the shaft direction.

16. A developer accommodating device according to claim 14, wherein the rotational shaft includes a screw disposed in the second chamber of the first portion and configured to convey the developer of the second chamber toward the second portion by a rotation of the rotational shaft.

17. A developer accommodating device according to claim 13, wherein the opening portion is a first opening portion, and the developer accommodating device further comprises:

a shutter including a shielding portion and a second opening portion, the shutter being movable between a closing position where the shielding portion shields the first opening portion and an opening position where the second opening portion opposes the first opening portion to open the first opening portion, wherein, in a posture where the longitudinal direction is a horizontal direction and the first opening portion is positioned downward in a gravity direction, the shutter moves from the closing position to the opening position by successively performing a first operation in which the developer accommodating device is mounted on the developing unit in the mounting direction and a second operation in which the developing unit rotates about a rotational center of the conveying portion.

18. A developer accommodating device according to claim 17, wherein in a state in which the second operation is completed, a straight line connecting the rotational center of the conveying portion and a rotational center of the agitating member extends along the horizontal direction as seen in a longitudinal direction.

19. A developer accommodating device according to claim 17, wherein in a state in which the developing unit is mounted on a main assembly of an image forming apparatus, the developer accommodating device is mountable to and dismountable from the developing unit.

20. A developer accommodating device according to claim 13, wherein the developing unit includes:

a housing extending in the longitudinal direction and configured to accommodate the developer and including a receiving opening configured to receive the developer from the developer accommodating device;

a developer shutter movable between an opening position where the developer shutter opens the receiving opening and a closing position where the developer shutter closes the receiving opening; and a mounting portion on which the developer accommodating device is mounted.

* * * * *